US012589933B2

(12) United States Patent
Curtis

(10) Patent No.: US 12,589,933 B2
(45) Date of Patent: Mar. 31, 2026

(54) ADAPTABLE FOAM GRID SYSTEM FOR INSERTION INTO PROTECTIVE CASE

(71) Applicant: Ryan Curtis, Reno, NV (US)

(72) Inventor: Ryan Curtis, Reno, NV (US)

( * ) Notice: Subject to any disclaimer, the term of this patent is extended or adjusted under 35 U.S.C. 154(b) by 0 days.

(21) Appl. No.: 18/911,141

(22) Filed: Oct. 9, 2024

(65) Prior Publication Data

US 2025/0388380 A1 Dec. 25, 2025

Related U.S. Application Data

(63) Continuation-in-part of application No. 18/752,504, filed on Jun. 24, 2024, and a continuation-in-part of application No. 18/758,352, filed on Jun. 28, 2024, now Pat. No. 12,421,008.

(51) Int. Cl.
*B65D 81/107* (2006.01)
*B25H 3/06* (2006.01)
*F41C 33/06* (2006.01)

(52) U.S. Cl.
CPC ............ *B65D 81/1075* (2013.01); *B25H 3/06* (2013.01); *B65D 2581/055* (2013.01); *F41C 33/06* (2013.01)

(58) Field of Classification Search
CPC .............. F41C 33/06; B65D 2581/055; B65D 81/1075; B25H 3/02; A45C 13/02; A45C 3/02
USPC .................................................. 206/522–594
See application file for complete search history.

(56) References Cited

U.S. PATENT DOCUMENTS

| | | | | |
|---|---|---|---|---|
| 2,612,700 A * | 10/1952 | Frisk | G01B 3/00 | 33/561.1 |
| 4,733,806 A * | 3/1988 | Sloop | A45F 3/02 | 224/601 |
| 5,641,068 A * | 6/1997 | Warner | B65D 5/509 | 206/593 |
| 6,298,587 B1 * | 10/2001 | Vollom | G01B 5/207 | 33/561.1 |
| 6,843,458 B1 * | 1/2005 | Robinson | A47G 23/0216 | 248/314 |
| 6,860,784 B2 * | 3/2005 | Chernov | G09B 25/00 | 40/427 |
| 6,890,138 B1 * | 5/2005 | Myrick | B60P 7/0892 | 410/97 |
| 7,654,021 B2 * | 2/2010 | Kleyman | G01B 5/207 | 33/561.1 |
| 9,358,930 B1 * | 6/2016 | Sic | B60N 3/101 | |
| 10,213,913 B2 * | 2/2019 | Pang | B65D 25/106 | |

(Continued)

*Primary Examiner* — Chun Hoi Cheung
(74) *Attorney, Agent, or Firm* — Eric Hanscom

(57) ABSTRACT

An omni foam grid system for insertion into a protective case has a grid plate sandwiched between a lower perimeter frame, or series of stepped pegs or peg/holster combinations, and an upper perimeter frame. The grid plate has a lattice that forms round or square holes, into which round or square pegs are frictionally inserted. The lower perimeter frame or pegs position the grid plate above the bottom of the case, such that when an object such as a gun or drone is pressed into the invention, the pegs under the invention depress into the negative space, leaving undepressed pegs on all sides of the object to prevent lateral movement during transport in the case. The lid of the case closes upon the object, thereby securing and protecting it with foam on all sides.

11 Claims, 38 Drawing Sheets

(56) References Cited

U.S. PATENT DOCUMENTS

| | | | | |
|---|---|---|---|---|
| 10,351,287 | B2 * | 7/2019 | Eberbach | B65B 55/20 |
| 10,843,252 | B2 * | 11/2020 | Woidasky | B21D 43/26 |
| 11,753,228 | B2 * | 9/2023 | Busenitz | B65D 81/05 206/592 |
| 2005/0023164 | A1 * | 2/2005 | Hung | B25H 3/06 206/349 |
| 2014/0262922 | A1 * | 9/2014 | Johnson | B25H 3/06 206/565 |
| 2020/0407144 | A1 * | 12/2020 | Kemp | B65D 43/163 |

* cited by examiner

ADAPTABLE FOAM GRID SYSTEM FOR INSERTION INTO PROTECTIVE CASE

CROSS REFERENCE TO RELATED APPLICATIONS

This utility patent application claims priority back to U.S. Utility application Ser. No. 18/752,504, filed Jun. 24, 2024, and Ser. No. 18/758,352, filed Jun. 28, 2024, both for an "Adaptable foam grid system for insertion into protective case.", the contents of which are incorporated by reference into this application.

STATEMENT REGARDING FEDERALLY SPONSORED RESEARCH OR DEVELOPMENT

This invention was not federally sponsored.

FIELD OF THE INVENTION

This disclosure is directed generally to protective inserts for cases made to carry valuable and potentially fragile products, and more specifically to an insert with a grid plate with pegs that allow for an item to be pressed into the pegs, depressing the pegs under the item to secure it from the bottom and on all sides.

BRIEF DESCRIPTION OF THE INVENTION

The invention provides an omni, resettable foam grid system for insertion into a protective case or any other type of container, with an elevated grid plate with openings into which pegs with different shapes and sizes can be inserted. In one embodiment, the grid plate is sandwiched between a lower perimeter frame and an upper perimeter frame; in another embodiment, the grid plate is elevated on stepped pegs. The grid plate can have round or square holes, into which round or square pegs are inserted and held in place by friction, as the pegs are slightly larger than the openings in the grid plate. The pegs can be the same size as the holes, or, preferably, even slightly bigger, so that when they are moved up or down, they are made secure in their new location through the compressibility of the substance from which they are made. The lower perimeter frame—or the series of stepped pegs—positions the grid plate above the bottom of the case, such that when an object such as a firearm, drone, tools, guitar, and camera/or another other item that fits within the insert and the case can have a pre-planned resting spot created by a user pushing pegs into the negative space, leaving undepressed pegs on all sides of the object to prevent lateral movement during transport in the case. As opposed to the prior art, this allows a user to merely press an item down on the field of pegs and create a protective cavity in which the pegs offer protection and support from both the sides and bottom of the case. As the pegs are pushed further into the bottom of the case, they compress and offer even greater protection to the bottom of the item.

As an alternative to the lower perimeter frame, or in combination with it, four or more "straight pegs in holsters" can be used. In one embodiment of this idea, the stepped pegs have a lower portion with a diameter greater than the holes in the grid place, and an upper diameter small enough to fit through the holes in the grid plate, such that the grid plate rests of the "step" in the stepped peg. The invention can be used over and over again with different objects, as once the system has been used to transport a first object with a first shape, the user merely removes the upper perimeter and grid plate, flips it over and then pushes all the pegs back to their original position, ready for a second object to be depressed into the pegs, creating a second shape. The lid of the case can be lined with foam and closes upon the object, thereby securing and protecting it with foam on all sides. The invention allows for the safe, secure and protected transportation of a valuable and/or fragile object. In another embodiment, the invention has an elevated grid with foam pegs that is held up by a "lower support", which in this case is a straight peg of uniform diameter that has been slipped into a holster, where the holster has indentations on its inside surface. The indentations press into the outer sides of the straight peg, frictionally retaining it. The invention can be used over and over again with different objects, as once the system has been used to transport a first object with a first shape, the user merely removes the upper perimeter and grid plate, flips it over and then pushes all the pegs back to their original position, ready for a second object to be depressed into the pegs, creating a second shape. The lid of the case can be lined with foam and closes upon the object, thereby securing and protecting it with foam on all sides. The invention allows for the safe, secure and protected transportation of a valuable and/or fragile object.

Once an item is removed from the case, the pegs can be easily "reset" by pushing them back up. At this point the case is ready to protect a new object and makes the invention reusable multiple times.

SUMMARY OF KEY POINTS AND BENEFITS PROVIDED BY THE INVENTION

1. The grid plate is elevated (or suspended) above the bottom of the case.

2. The pegs are held in the gid by friction, allowing them to also be elevated/suspended, above a negative space at the bottom of the case.

3. The elevated grid creates the space below for the pegs to pushed down, creating a protective perimeter around the object on the surface of the elevated grid and support on the bottom from the depressed pegs.

4. The user can easily reset the pegs to original position by simply pushing the pegs back.

5. The lower support that holds the grid plate in an elevation position is, in a preferred embodiment, be a plurality of either stepped pegs or straight pegs of uniform diameter that has been slipped into holsters, where each holster has indentations on its inside surface. The indentations press into the outer sides of the straight peg, frictionally retaining it.

There are a number of substances from which the various parts of the invention can be made. The upper and lower perimeters are preferably made from foam. The grid plate can be made of foam, plastic, wood, or even metal. The pegs are preferentially made from foam, but plastic and rubber are also contemplated.

There are some inventions that have tried to bring some of the positive aspects of this invention to similar products. For example, US20240044614A1 to Magpul Industries Corp describes an organizer system for use with a case including a base and a lid configured to be matingly coupled together for containing an object therein is disclosed. The organizer system includes a panel system including at least one panel, the at least one panel including a plurality of cutouts formed therein, and a plurality of mounting blocks, each one of the of mounting blocks including a block body and at least one stud. The stud is configured to be removably insertable into one of the plurality of cutouts. When the mounting blocks are inserted into the cutouts adjacent to the object then the base and the lid are coupled together, the panel system and the mounting blocks cooperate to prevent shifting of the object within the case. A method for storing an object in a case using an organizer system is also disclosed.

This invention, however, relies on panels with cutouts, and uses pegs—called studs in this application—that do not depress to cradle an item of value/fragility. Magpul's grid plate is not elevated, as it is in the current invention, thus, there is no way for any "pegs" to depress to form a protective cradle. Magpul's blocks do not move up or down, thus, they provide to adaptable cushioning effect. Finally, Magpul's use of removable and interchangeable blocks with different sizes and shapes in no way approaches the current invention's movable pegs in terms of providing an adaptable, changeable, adjustable cushion for an object.

Another prior art is found in U.S. Pat. No. 4,733,806 for a "Case" to Conrad B. Sloop provides a camera shoulder case a lower case part which holds the equipment, a cover pivotally mounted to the rear of the lower case part, and a shoulder strap having opposite ends mounted to opposite sides of the lower case part. The lower case part can be partitioned by the user to securely hold equipment by the use of pylon devices that can be installed in selected holes of an array of holes formed at the bottom of the lower case part. While this device would function to protect a valuable camera, the versions of "pegs" in this application do not move up and down, as the Sloop's version of the "grid plate" is not elevated, but rather provide lateral protection against an item moving side to side. Instead, Sloop's "pegs" are merely added or taken away to create a cavity into what the item fits; the pegs provide no bottom support to the item.

Other prior arts include U.S. Pat. No. 7,246,704 for "Tool and accessory container with inner grid system" to Black and Decker Inc. contain two container members that are rotably connected to create an inner compartment. Again, this invention uses something close to the pegs of the current invention, but the Black and Decker invention does not allow for their version of Curtis' "pegs" to move up and down. As with the Magpul reference, Black and Decker's version of the "grid plate" is not elevated, and like the Sloop reference, the protection is created not through depressible pegs, but rather, through adding a series of removable/interchangeable blocks with different sizes and shapes.

WO Publication No. 2023172351 to Roberts, etc. is another firearm case with locking latches. This invention, however, also does not have movable pegs that cradle an item, and, like the Black and Decker reference, lacks an elevated grid plate and a way for an item to be protected on both its side and bottom by pegs that can be depressed through an elevated grid plate.

Likewise, U.S. Pat. No. 11,063,473 to Robert Bosch GmbH for a "Handheld tool carrying case", but like the Roberts prior art, does not feature pegs that can move up and down in a grid plate to form a depression into which an item can rest. There is no teaching in this prior art of how an elevated grid plate allows for pegs to be depressed down to provide a protective hole for an item where the item is supported and protected by pegs on both its bottom and sides.

Similarly, U.S. Pat. No. 6,685,023 to Bleggi, etc. for a "Case for flexible elongated objects" teaches a carrying case for storing flexible elongated objects. This invention, however, does not use movable pegs to form a protective cradle for an item. Instead, the Bleggi reference has pegs that can be added to create a "shape", into which an item is placed.

The Curtis invention, on the other hand, does not need pegs to be added or removed to create a desired protective shape, Curits' protection depends on an elevated grid plate with movable pegs being depressed by an item to create a protective cradle below and on the sides of the item.

The prior art also supplies U.S. Pat. No. 10,351,287 to IBM for a "method for using a package insert for cushioning an object", which describes a method of using a package insert to cushion an item during transport. Pins in this invention can be frictionally inserted from a sideways perspective to support an item. This patent, however, does not allow the item to create its own depression using pegs that can move up or down through a grid plate. This patent covers packaging, and is not intended for multiple uses, as the "pegs" in this case are cut off to fit the item into a package. The current invention, on the other hand, has its protection coming from pegs that move vertically through holes in an elevated grid plate.

US Publication No. 2016/0176606 to Agil Packaging System SI for a "Packaging for protecting objects and method for manufacturing same" shows a packaging device that includes a cover obtained from a packaging sheet derived from a film, with transverse and longitudinal joint lines, to establish pads between them that are filled with fluid in order to achieve the protection of an object around the exterior of which the protective cover is applied to fit. The cover can have pads that are closed or open and connected together, allowing the fluid to pass. The packaging sheet also has fold zones to enable it to be fitted to the outline or shape of the object to be protected, gap zones to fit the surface of the object to be protected, and closure zones to close the sheet onto itself, fitting the object to be protected. Once again, however, there are no fields of pegs which can move up and down through a grid plate to create a depression for an item.

U.S. Pat. No. 6,890,138 to John M. Myrick for a "Modular pegboard cargo restraint" describes a pegboard system where, again, the "pegs" don't move up and down in a grid system, but rather are located to prevent lateral movement of an item. As with many of the prior arts, this patent requires its version of "pegs" to be added or moved around to create a shape into which the item is placed. The "pegs" cannot be used to provide any protection on the bottom of the item.

The current invention provides a superior method of protecting an item by providing an omni foam grid system for insertion into a protective case has a grid plate sandwiched between a lower perimeter frame and an upper perimeter frame, or resting upon a series of stepped pegs. The grid plate has a lattice that forms round or square holes, into which round or square pegs are inserted. The lower perimeter frame or a series of stepped pegs position the grid plate above the bottom of the case, such that when an object such as a firearm, drone, tools, guitar, and camera and/or any item that fits within the insert and case is pressed into the invention, the pegs under the invention depress into the negative space, leaving undepressed pegs on all sides of the object to prevent lateral movement during transport in the case. The lid of the case closes upon the object, thereby securing and protecting it with foam on all sides.

There has thus been outlined, rather broadly, the more important features of the invention in order that the detailed description thereof may be better understood, and in order that the present contribution to the art may be better appreciated. There are additional features of the invention that will be described hereinafter, and which will form the subject matter of the claims appended hereto. The features listed herein, and other features, aspects and advantages of the present invention will become better understood with reference to the following description and appended claims. The accompanying drawings, which are incorporated in and constitute part of this specification, illustrate embodiments of the invention and, together with the description, serve to explain the principles of the invention.

It should be understood the while the preferred embodiments of the invention are described in some detail herein, the present disclosure is made by way of example only and that variations and changes thereto are possible without departing from the subject matter coming within the scope of the following claims, and a reasonable equivalency thereof, which claims I regard as my invention.

BRIEF DESCRIPTION OF THE DRAWINGS

FIG. 39 is a side, perspective view of another embodiment of the square peg—this one with a square straight peg and a square holster, appearing assembled.

DETAILED DESCRIPTION OF PREFERRED EMBODIMENT

Figure 1:
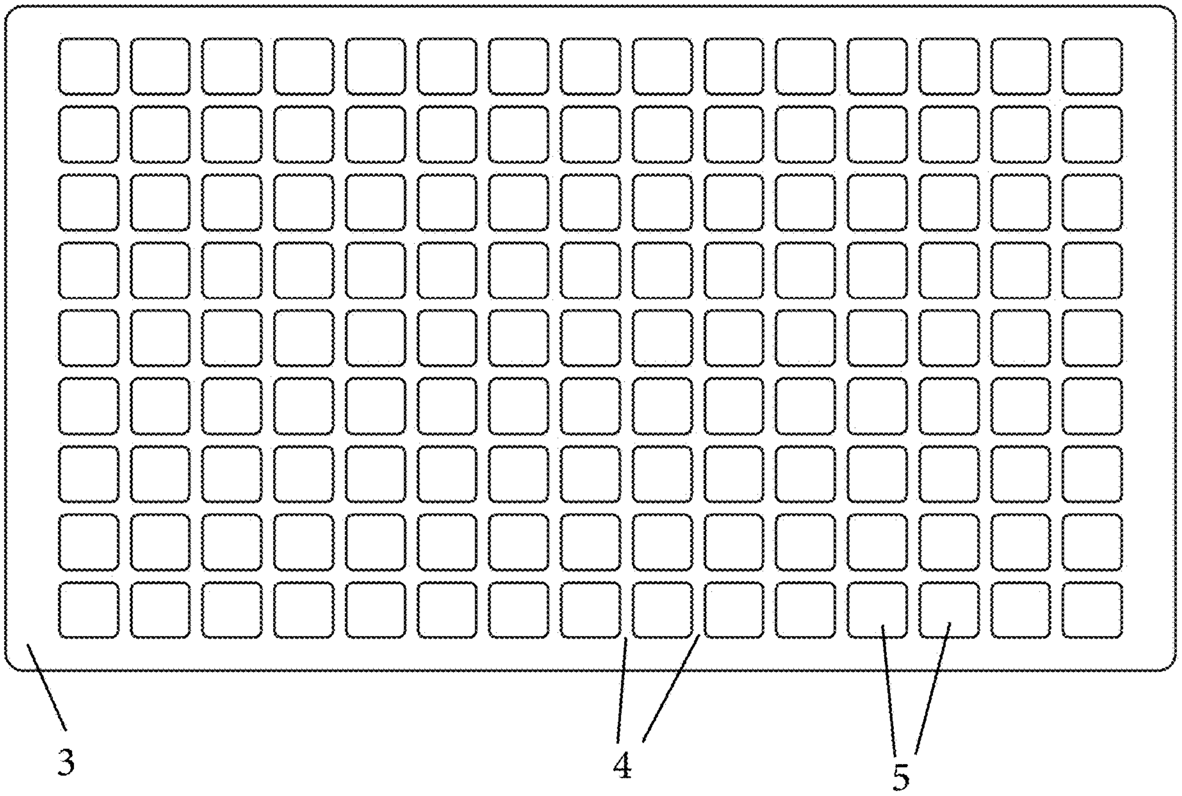
FIG. 1 is a top view of the grid plate portion of the invention with square holes.

FIG. 1 is a top view of the grid plate portion 3 of the invention. The grid plate 3 is a series of openings 5 defined by the lattice 4. The openings can be round, square, triangular, hexagonal, or any other shape. In this particular embodiment, the openings are square.

Figure 2:
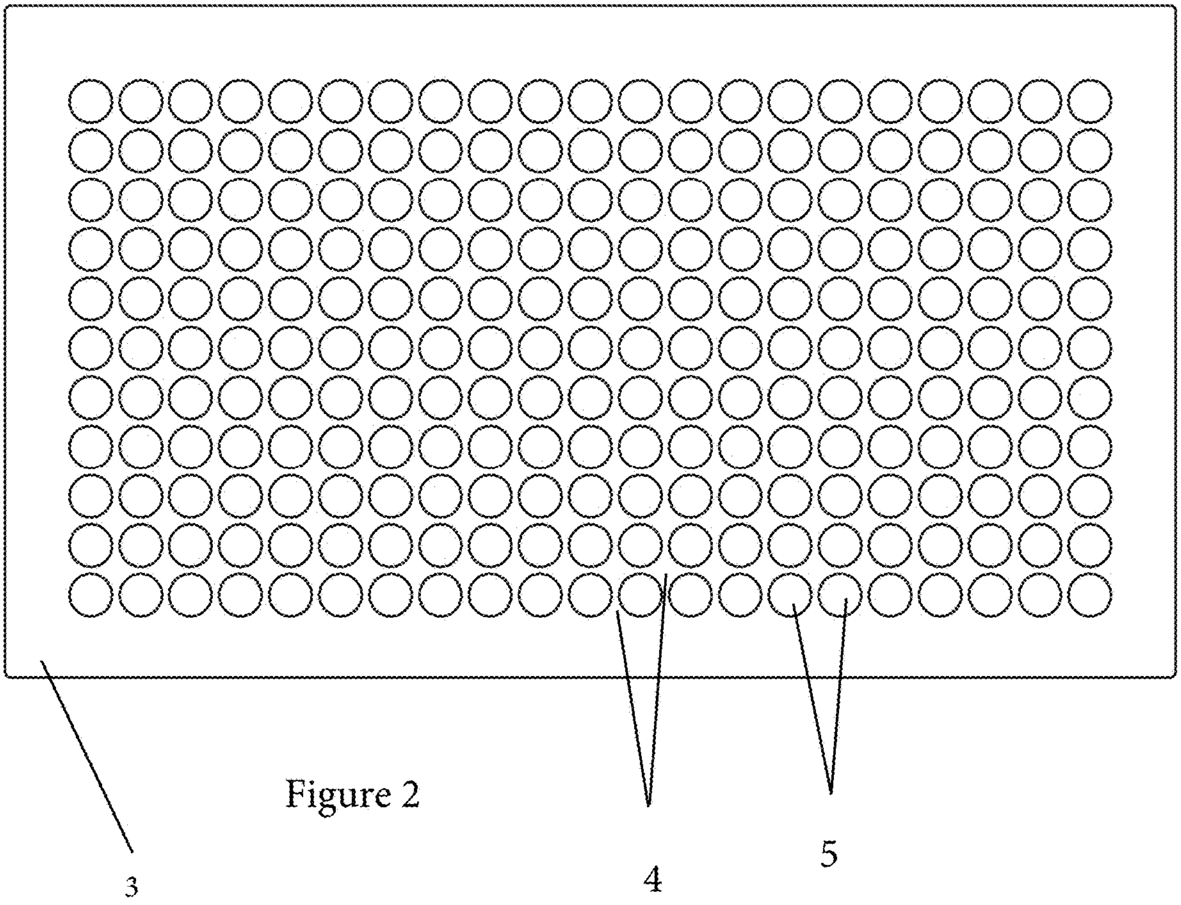
FIG. 2 is a top view of another embodiment of the grid plate with round holes.

FIG. 2 is a top view of another embodiment of the grid plate 3 where the openings 5 are round. The openings 5 are defined by the lattice 4.

Figure 3:
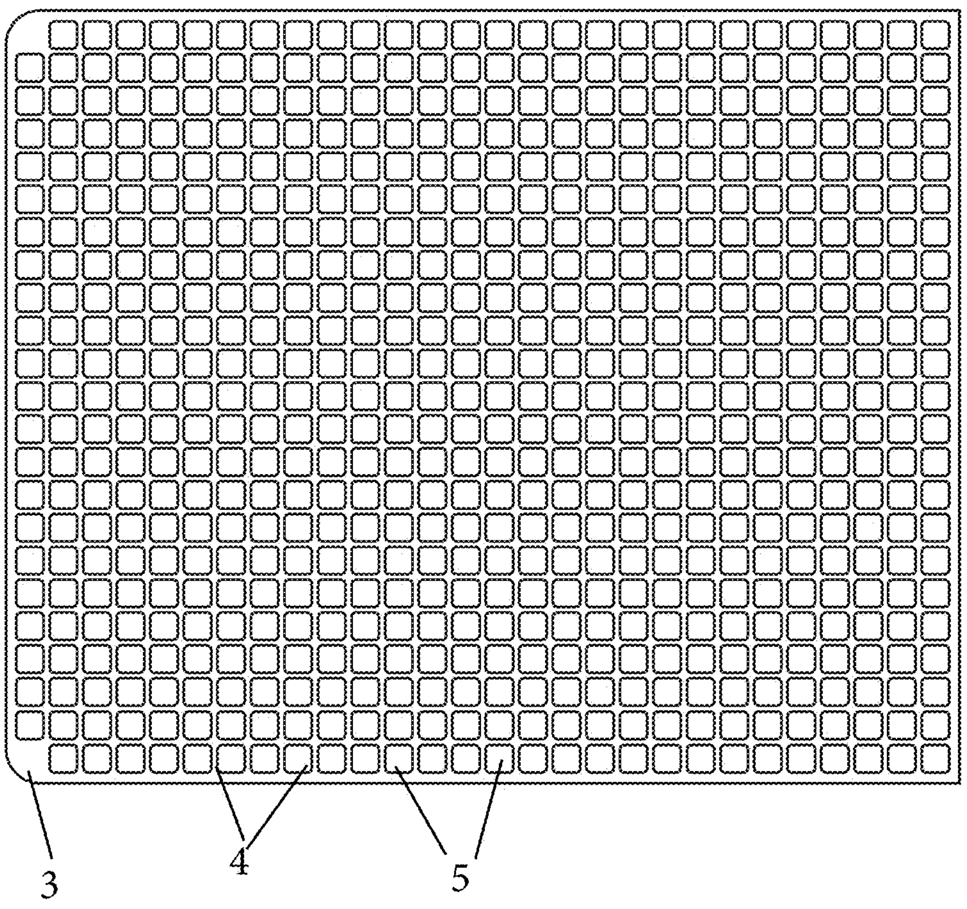
FIG. 3 is a top view of the grid plate portion of the invention.

FIG. 3 is another top view of a grid plate 3, where the openings 5 extend all the way to the edge of the grid plate. When this version of the grid plate is used with stepped pegs, there is no need for a bottom perimeter or top perimeter.

Figure 4:
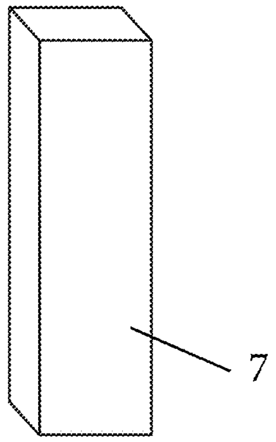
FIG. 4 is a perspective view of a square peg.

FIG. 4 is a perspective view of a square peg 7. A preferred embodiment calls for the pegs to be made of foam, but other materials such as plastic, rubber and even wood are contemplated. Inflatable pegs are also contemplated.

Figure 5:
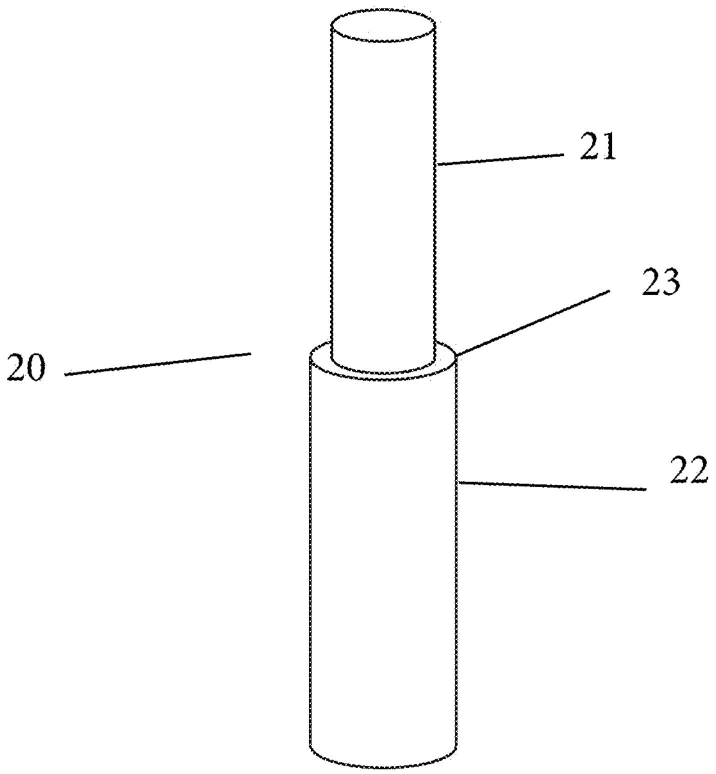
FIG. 5 is a perspective view of a stepped peg.

FIG. 5 is a perspective view of a stepped peg 20. The stepped peg has an upper portion 21, that is narrower than the opening on a grid plate, and a bottom portion 22, that is wider than the opening on a grid plate, such that the grid plates rests in an elevated position on the step 23. This creates the negative space under the grid plate into which certain pegs are pushed to create a protective cavity for the item to be stored.

Figure 6:
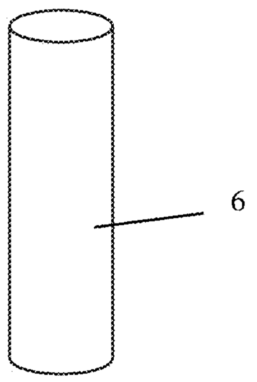
FIG. 6 is a perspective view of a round peg.

FIG. 6 is a perspective view of a round peg 6.

Figure 7:
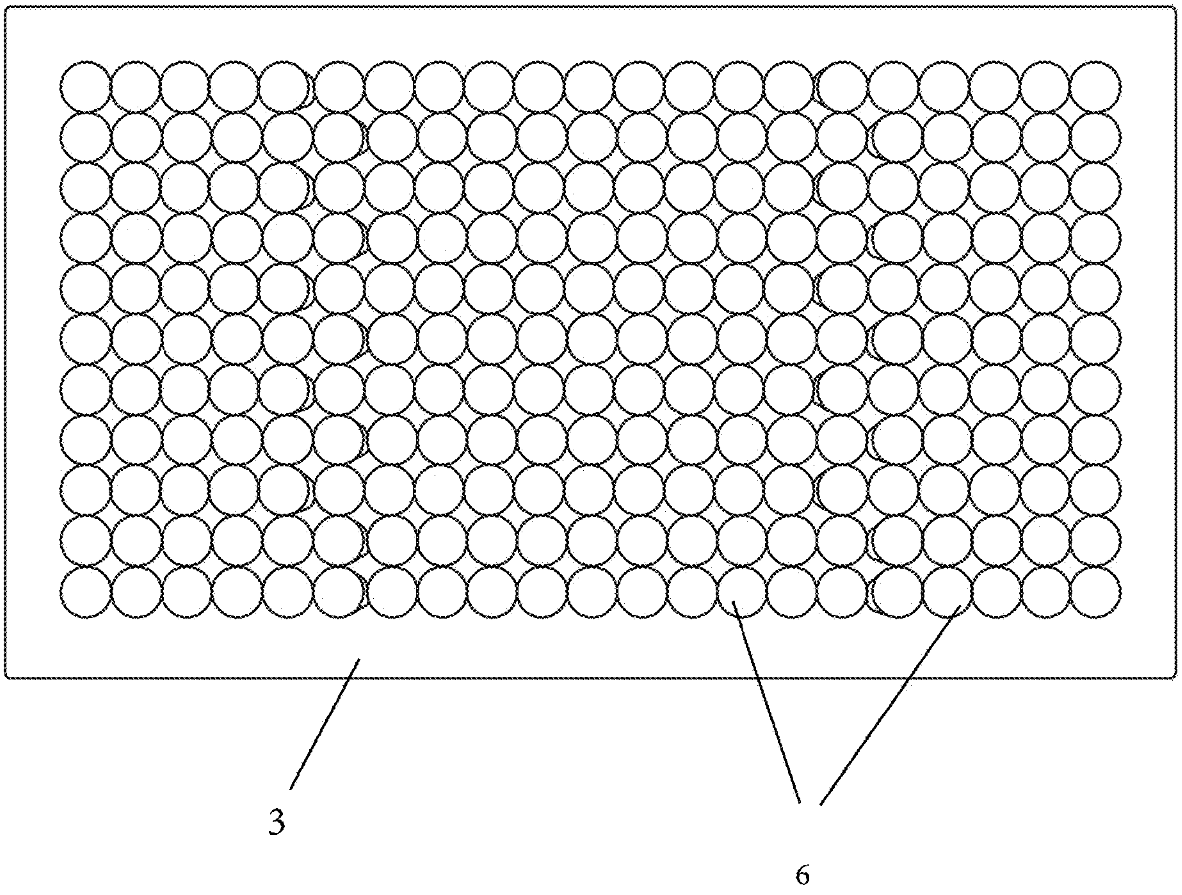
FIG. 7 is a perspective view of a grid plate with round pegs inserted.

FIG. 7 is a perspective view of a grid plate 3 with round pegs 6.

Figure 8:
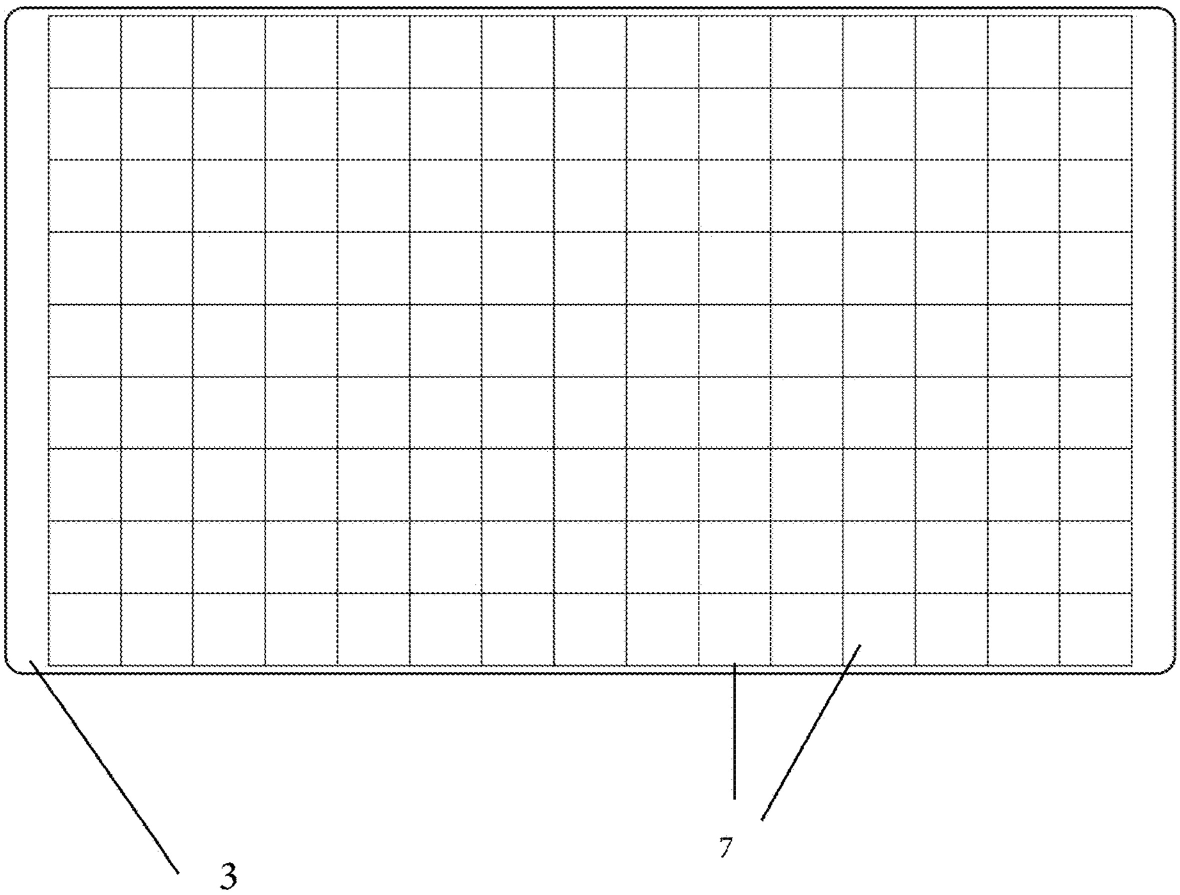
FIG. 8 is a top view of a grid plate with square pegs.

FIG. 8 is a perspective view of a grid plate 3 with square pegs 7. It should be noted that while round and square pegs are used for purposes of illustration, any shape of peg can be used and is contemplated by this invention.

Figure 9:
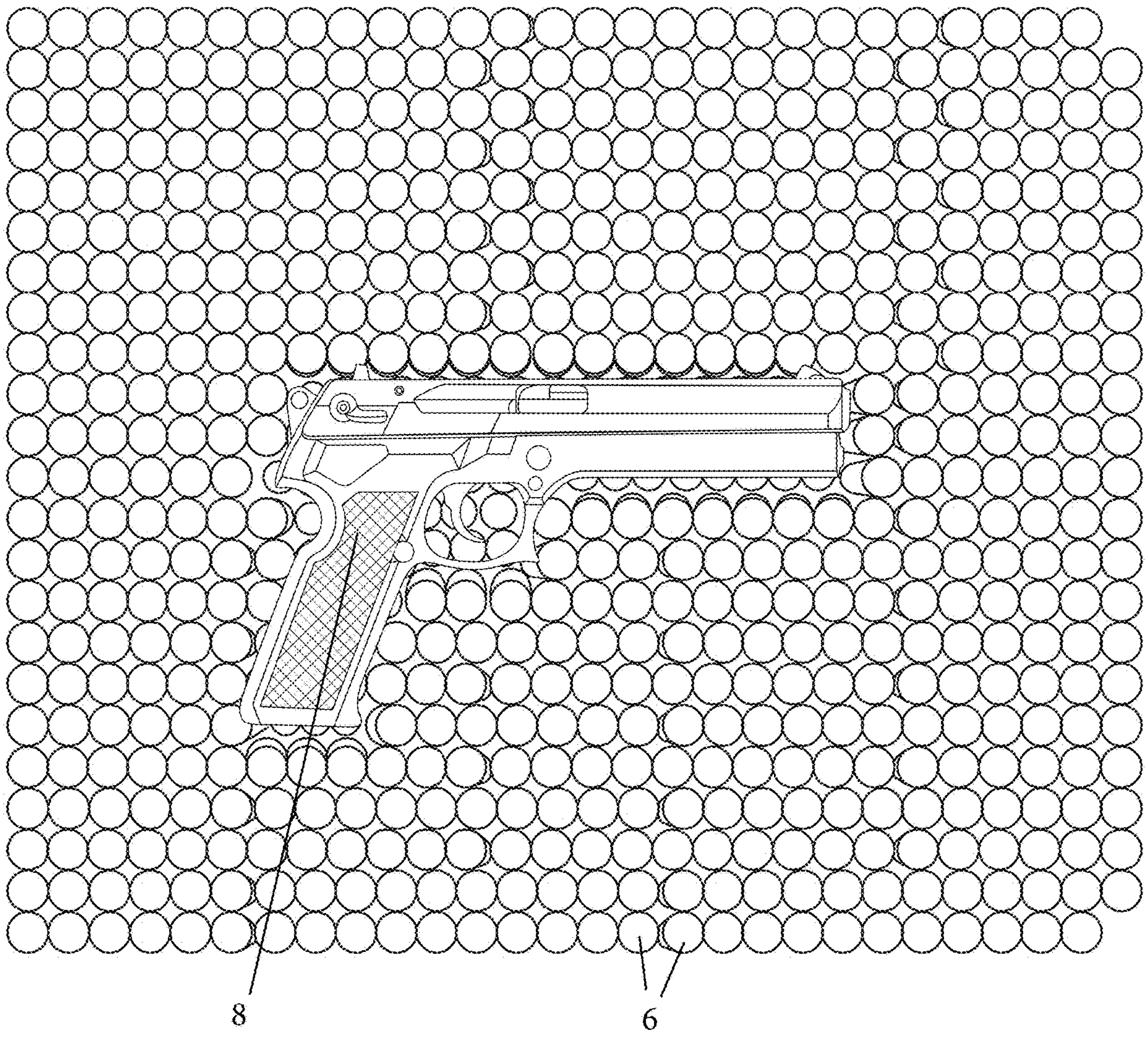
FIG. 9 is a top view of a firearm secured amongst pegs.

FIG. 9 is a perspective view of a toy pistol 8 installed in the invention showing how it nestles into the pegs 6. Because the lower perimeter 1 holds the grid plate above the bottom of the case, the pegs 6 under the toy pistol 8 and pressed down into the negative space, providing cushioning from below. The pegs that are not located under the toy pistol remain upright and provide cushioning from the sides, thereby securing the object from the bottom and from all four sides. A foam-cushion top of the case will finalize the security by pressing down on the object from above.

Figure 10:
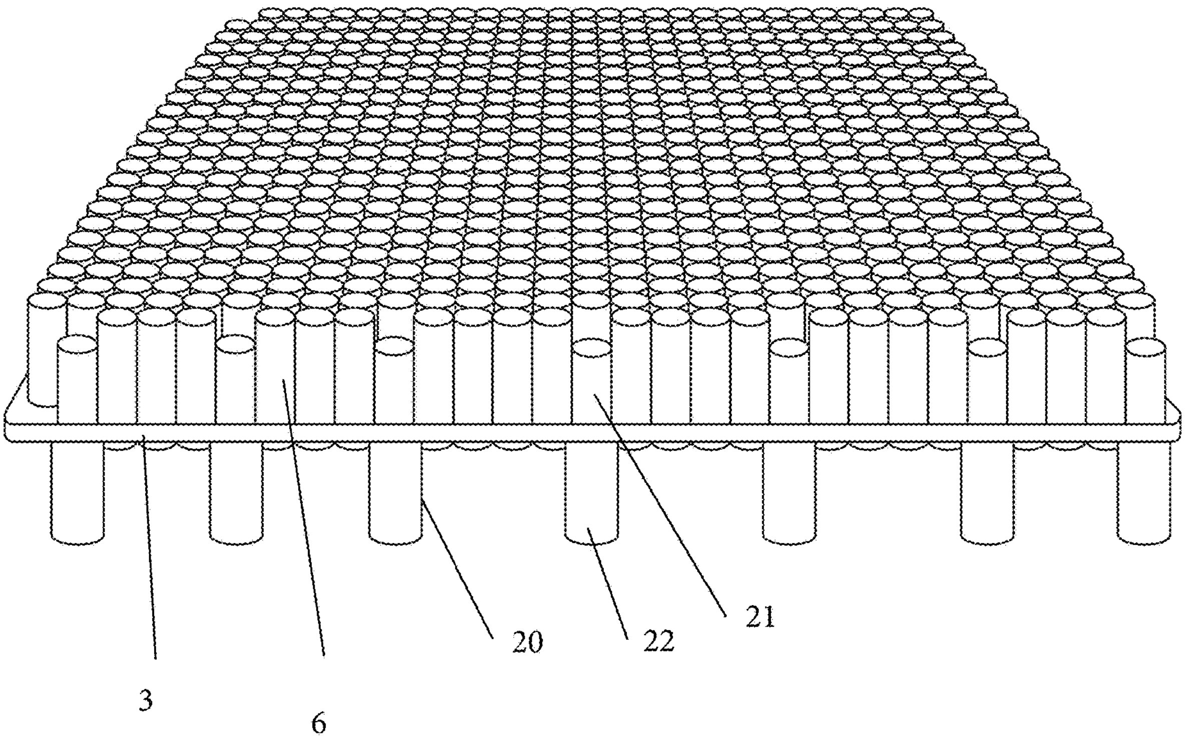
FIG. 10 is a side, perspective view of stepped pegs supporting a grid plate, where the grid plate is loading with round pegs.

FIG. 10 is a side, perspective view of a grid plate 3, full of round pegs 6, where the grid plate 3 is supported by stepped pegs 20. The stepped pegs 20 have an upper portion 21 that is narrower than the openings in the grid plate, and a bottom portion 22 that is wider than the openings. This allows the grid plate 3 to rest in an elevated position, such that some of the pegs 6 can be pushed down to create a protective pocket for an item.

Figure 11:
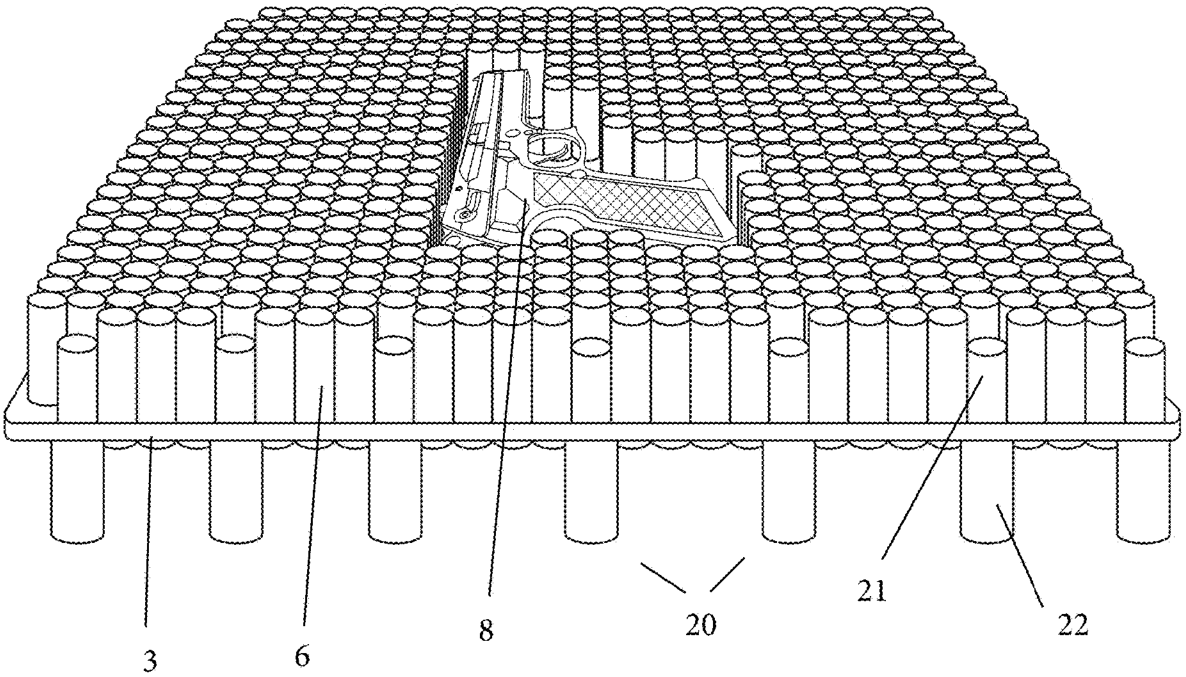
FIG. 11 is a perspective view of a pistol secured in the invention showing how it nestles into the pegs.

FIG. 11 is a side, perspective view showing how a pistol or other item 8 could be nestled into the pegs 6, and how the pegs could be pushed into the negative space portion of the invention in a pattern that mirrors the object they are going to protect the pegs are depressed into the negative space cushion the item from below, while the pegs that are not depressed cushion the object from the sides.

Figure 12:
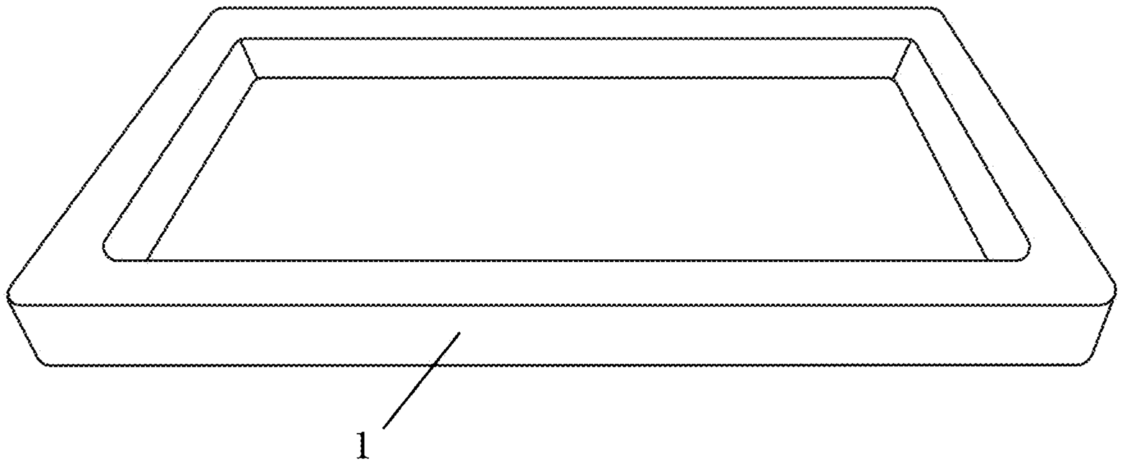
FIG. 12 is a side, perspective view of the lower perimeter.

FIG. 12 is a perspective view of the lower perimeter 1 portion of the invention. The lower perimeter 1 rests on the bottom of the case and elevates the grid plate (3 in other figures) above the bottom of the case, creating negative space (9 in other figures), into which pegs can be depressed to nestle an object.

Figure 13:
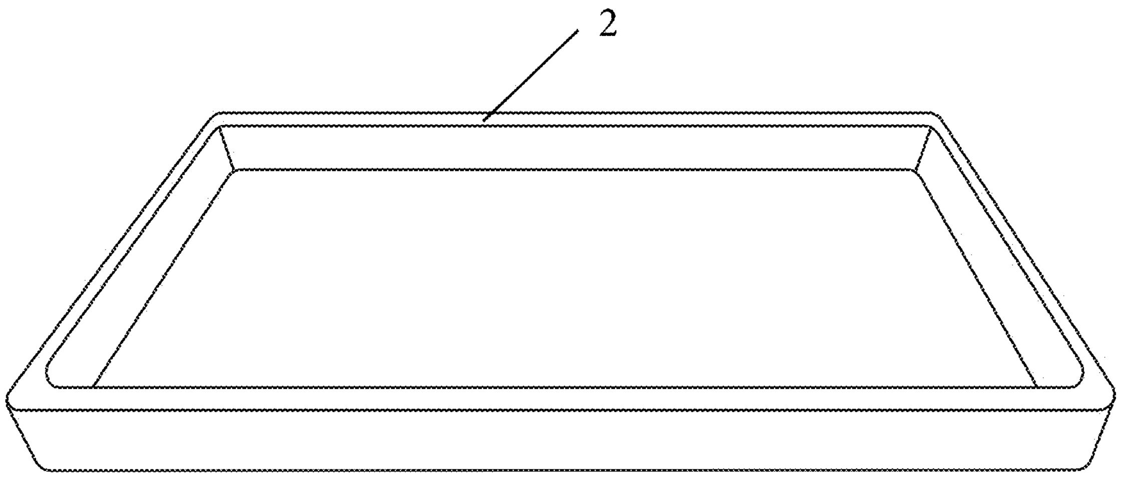
FIG. 13 is a side, perspective view of the upper perimeter.

FIG. 13 is a perspective view of the upper perimeter portion 2 of the invention. The upper perimeter 2 secures the grid plate and provides a perimeter against which the pegs are braced laterally, as well as protecting the grid plate from the edges of the case into which the invention will be placed.

Figure 14:
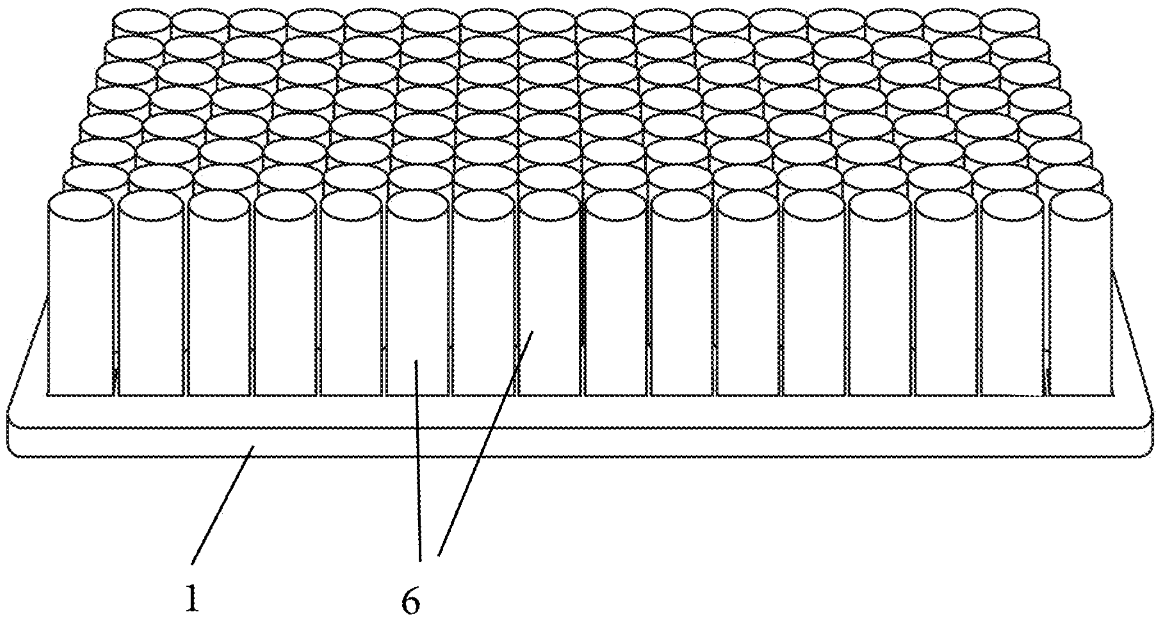
FIG. 14 is a side, perspective view of round pegs that have been inserted into the lower perimeter.

FIG. 14 is a side, perspective view of the lower perimeter 1 laterally restraining pegs 6.

Figure 15:
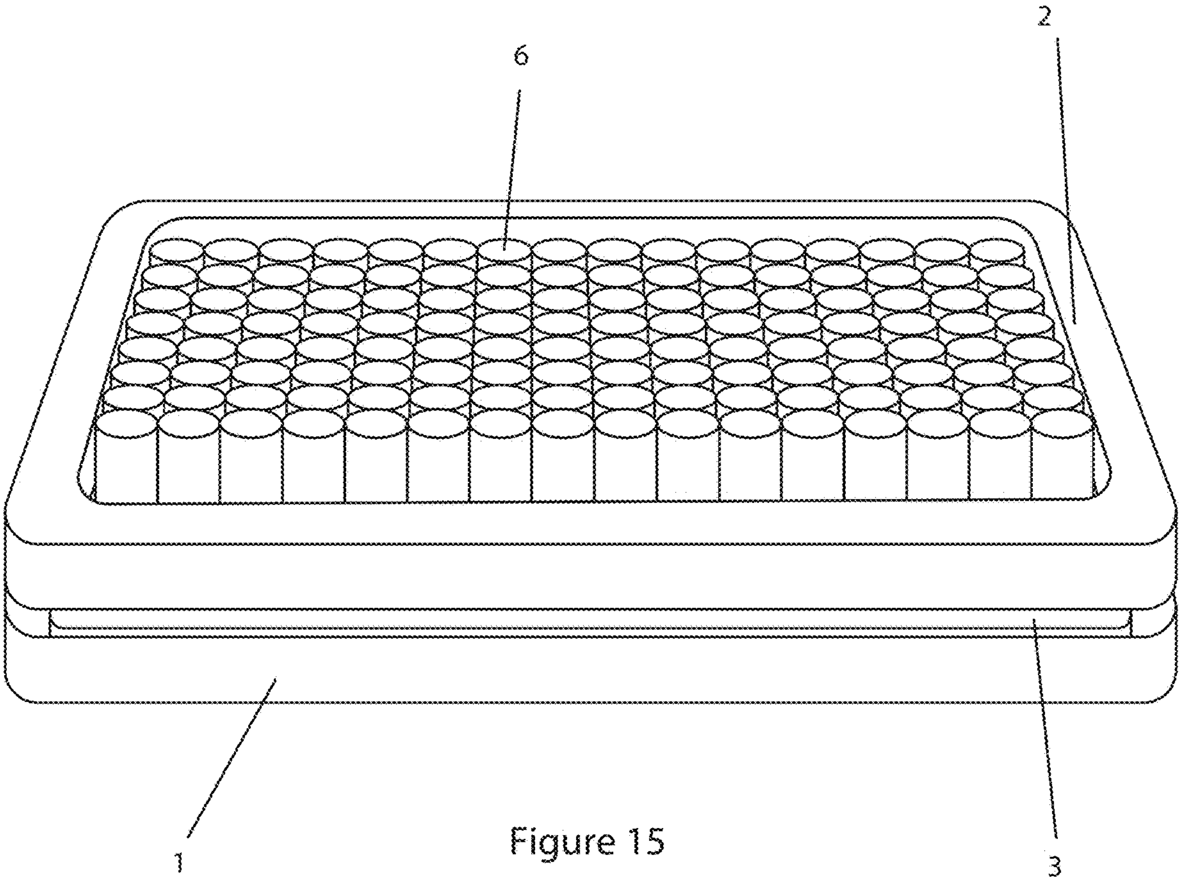
FIG. 15 is a side perspective view of the round pegs that have been inserted in the grid plate sitting on top of the lower perimeter with the upper perimeter added for protection.

FIG. 15 is a perspective view of one embodiment of the entire invention. The lower perimeter 1 locates the grid plate 3 above the bottom of the case, creating negative space. The upper perimeter 2 secures the grid plate from moving upward in the case, and the, in this case, round pegs 6 are ready for an object such as a pistol to be pushed into them, pushing their bottom ends into the negative space.

Figure 16:
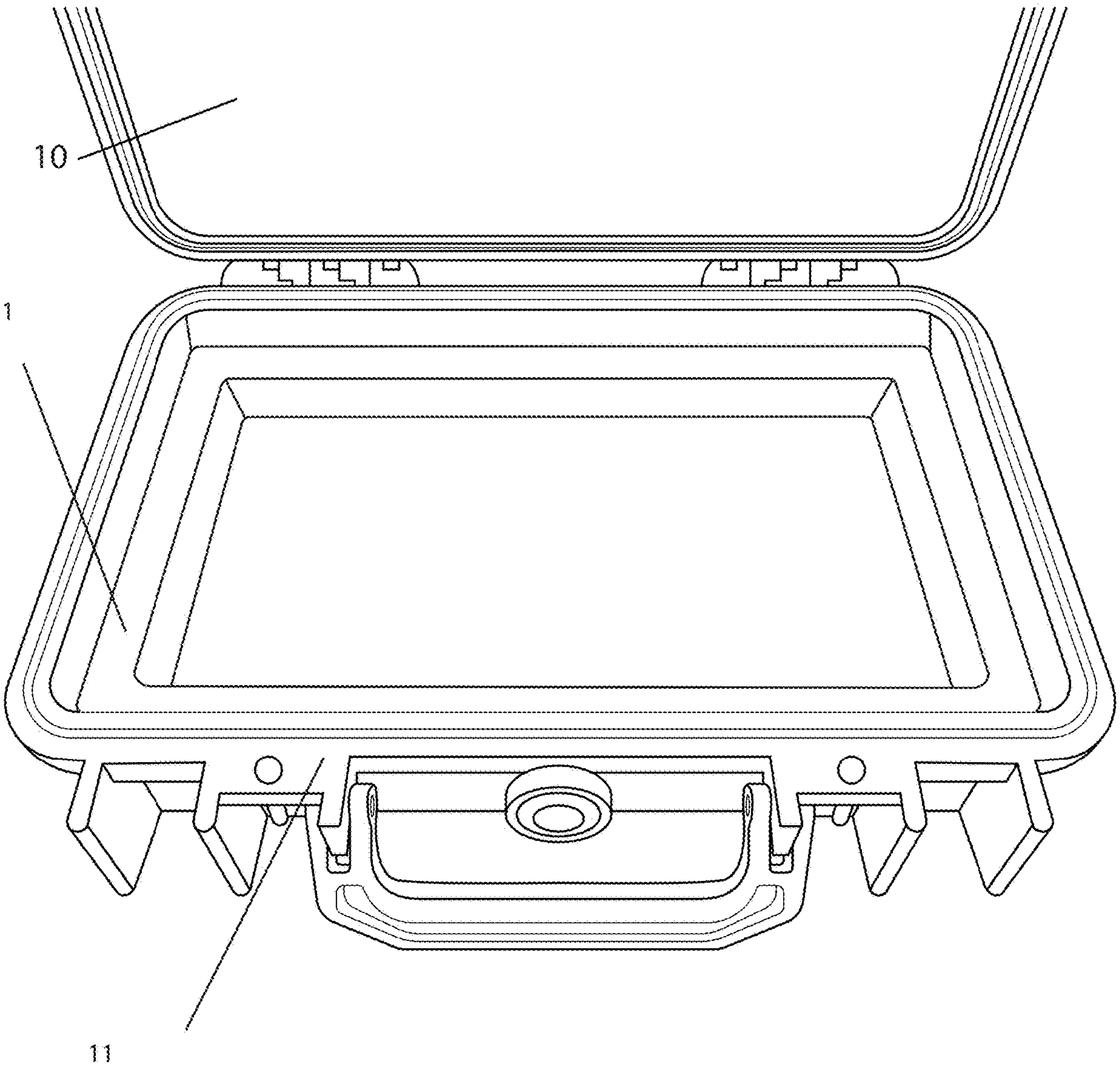
FIG. 16 a top, perspective view of a case into which the lower perimeter frame has been inserted.

FIG. 16 is a front, perspective view of a case into which the lower perimeter frame 2 has been inserted. The case top 10 will close upon the case bottom 11, but before that happens, some of the pegs 6 will be pushed down into the grid plate to create the desired protective pocket.

Figure 17:
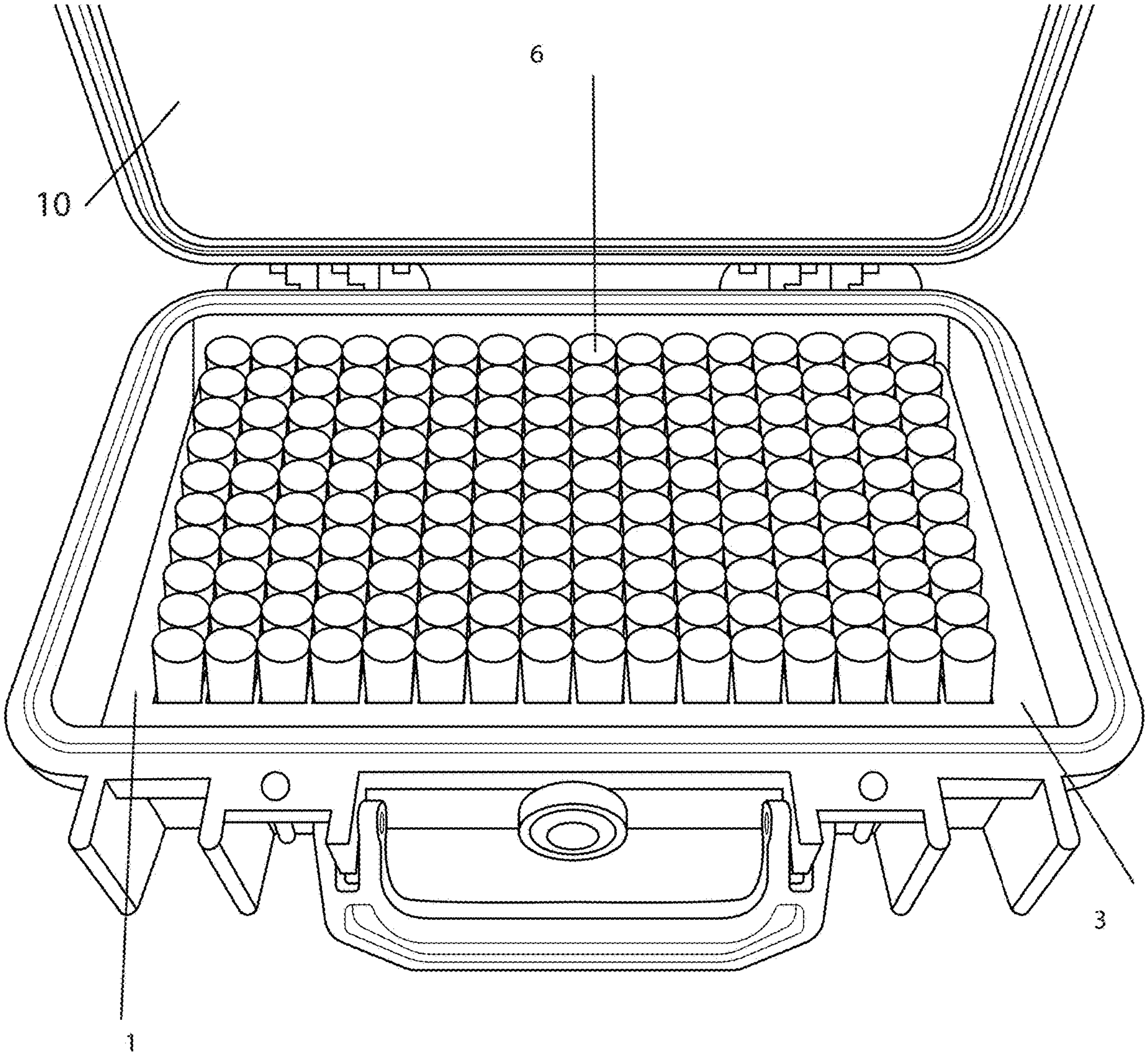
FIG. 17 a top, perspective view of a case into which the lower perimeter frame, the grid plate and some pegs have been inserted.

FIG. 17 a front, perspective view of a case into which the lower perimeter frame, the grid plate and the upper perimeter frame have been inserted, and a pattern 30 has been depressed into the pegs 6, simulating the kind of nestling protection the invention provides for a firearm, drone, or other value and/or fragile item.

Figure 18:
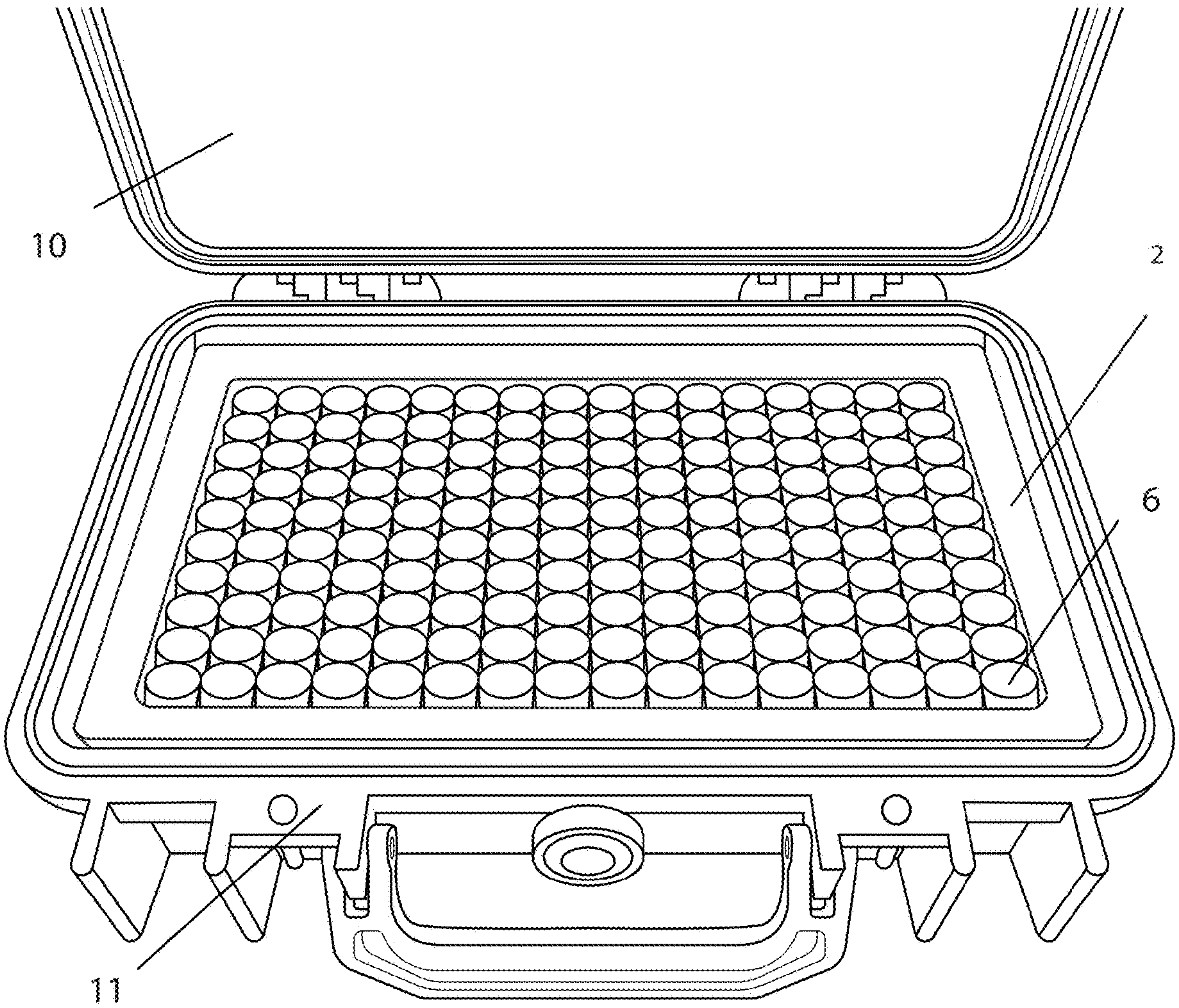
FIG. 18 a top, perspective view of a case into which the lower perimeter frame, the grid plate and some pegs have been inserted, and an upper perimeter added to provide protection from the side of the pegs.

FIG. 18 is a front, perspective of a case with a case top 10 and a case bottom 11, into which many pegs 6 have been inserted, and they are retained on the side by an upper perimeter frame 2.

Figure 19:
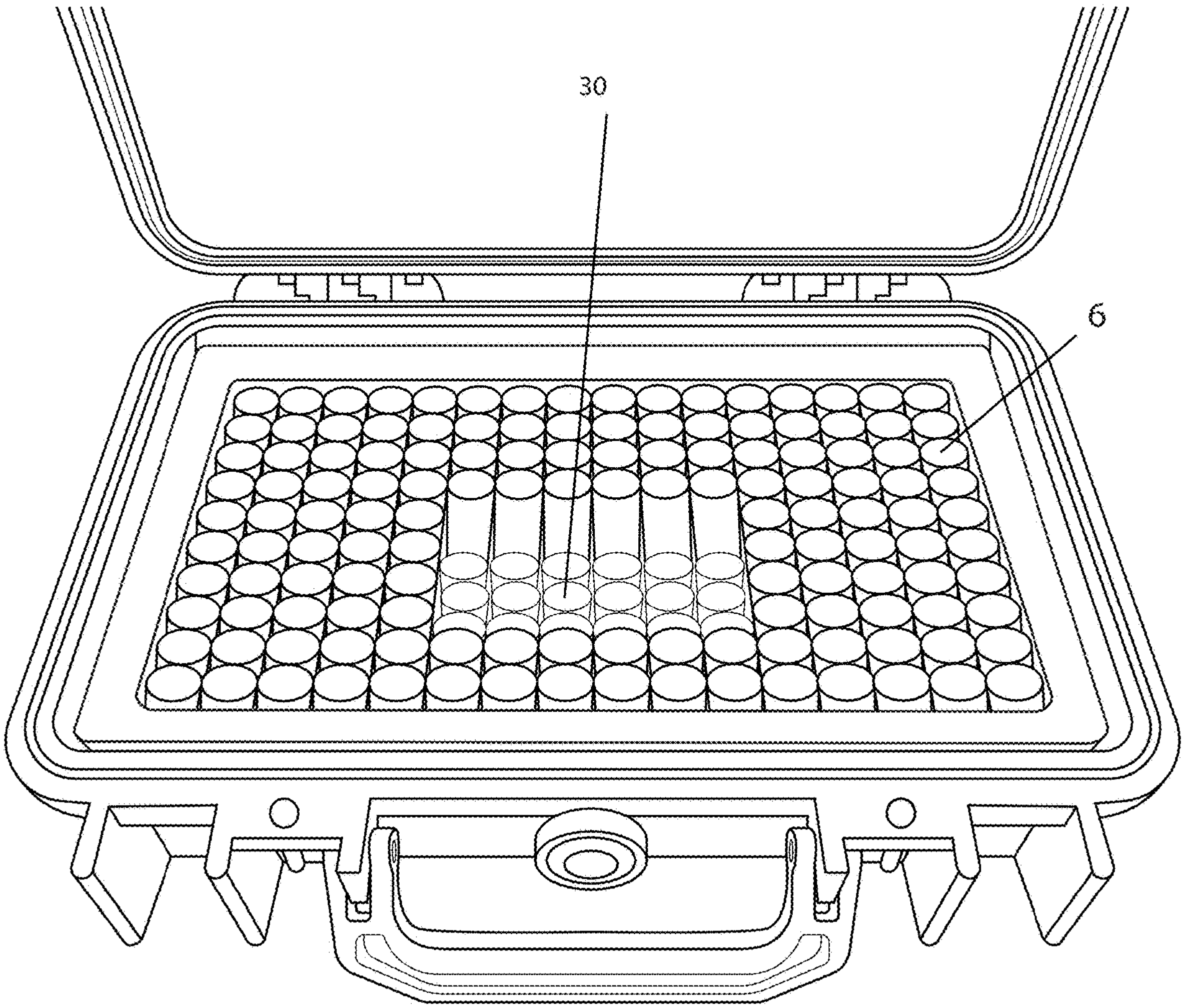
FIG. 19 is a top, perspective view of a case wherein a pattern has been depressed into the pegs, simulating the kind of nestling protection the invention provides for a firearm, drone, or other value and/or fragile item.

FIG. 19 is a front, perspective view of a case where a shape 30 has been created in anticipation of protectively retaining an object with a specific shape. Grid plate 3 is elevated by stepped pegs 20. Some of the pegs 6 have been depressed to create the shapes or pockets 30 into which the items will be placed.

Figure 20:
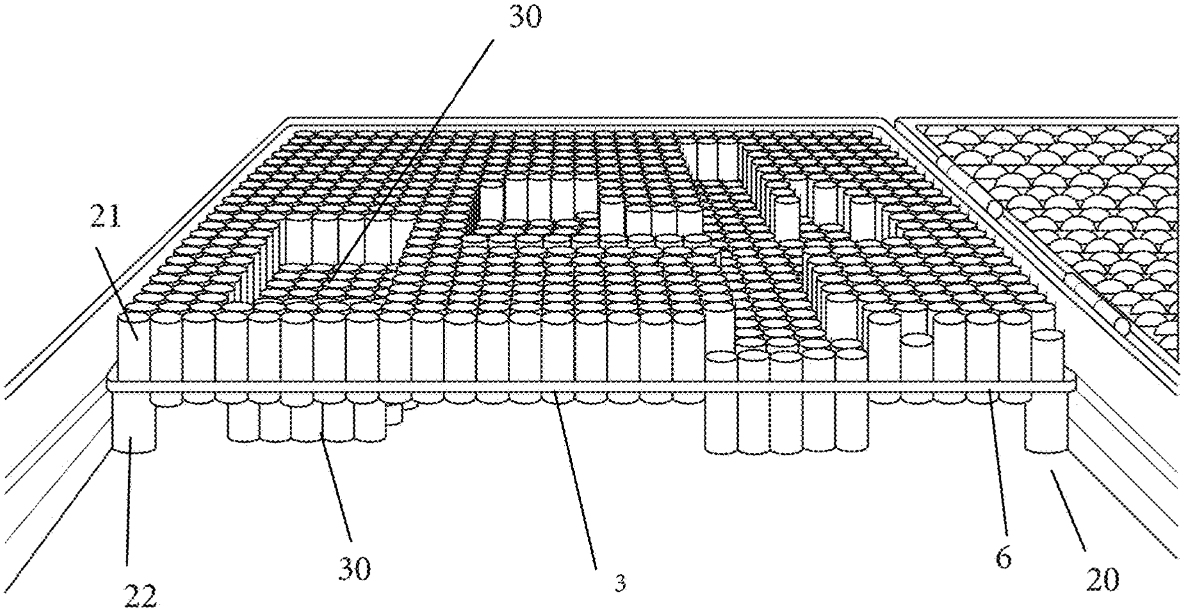
FIG. 20 a top, perspective view of a case into which the several stepped pegs hold up a grid plate, and some pegs have been depressed, simulating the kind of nestling protection the invention provides for a firearm, drone, or other value and/or fragile item.

FIG. 20 is a side, perspective view of a case with an elevated grid plate 3, that is supported by stepped pegs 20 which rest on the case bottom 11. Each of the stepped pegs has an upper portion 21 that fits through the openings of the grid plate, and a bottom portion 22 that is wider that the openings, thereby allowing the grid plate to rest on top of the "step" in the stepped pegs. The next step will be to insert pegs into the openings in the grid plate. It is contemplated that the pegs can be pushed down in several manners. First, a user could use the object to physically push down all the pegs in its shadow. Second, a user could physically push down the appropriate pegs, then rest the object in the depression created. Third, for a mass-produced insert, a certain pattern of pegs could be pre-depressed to fit a certain item at the time the insert was manufactured. It is also contemplated that a layer of very soft form could be inserted into the lower perimeter to give the bottom of the pegs additional support. Further improvements include contemplation of a layer of elastic or Spandex that stretches across the four sides of the lower perimeter. Under this embodiment, when an object is placed on top of the pegs, it would depress certain pegs against the layer of elastic or Spandex, but when the object was removed, the pegs would all pop up back to their original position.

Figure 21:
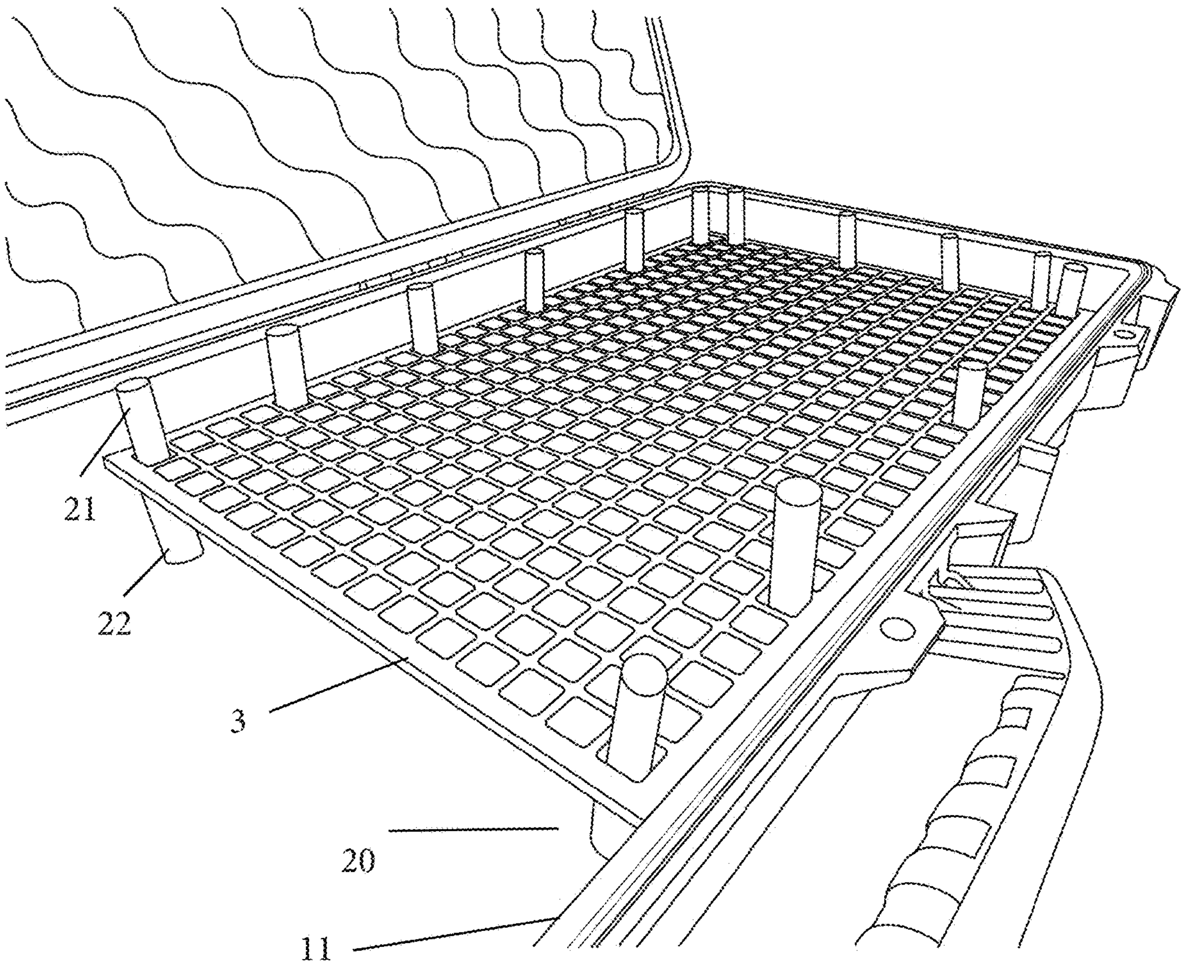
FIG. 21 is side, perspective view of a case with a grid plate being supported by stepped pegs.

FIG. 21 is a side, perspective view of a case with square pegs 7 into which a toy pistol 8 has been pressed, to show how the individual pegs under the pistol depress into the negative space, cushioning the pistol on the bottom, while the undepressed pegs on the side secure the pistol from moving sideways in the case.

Figure 22:
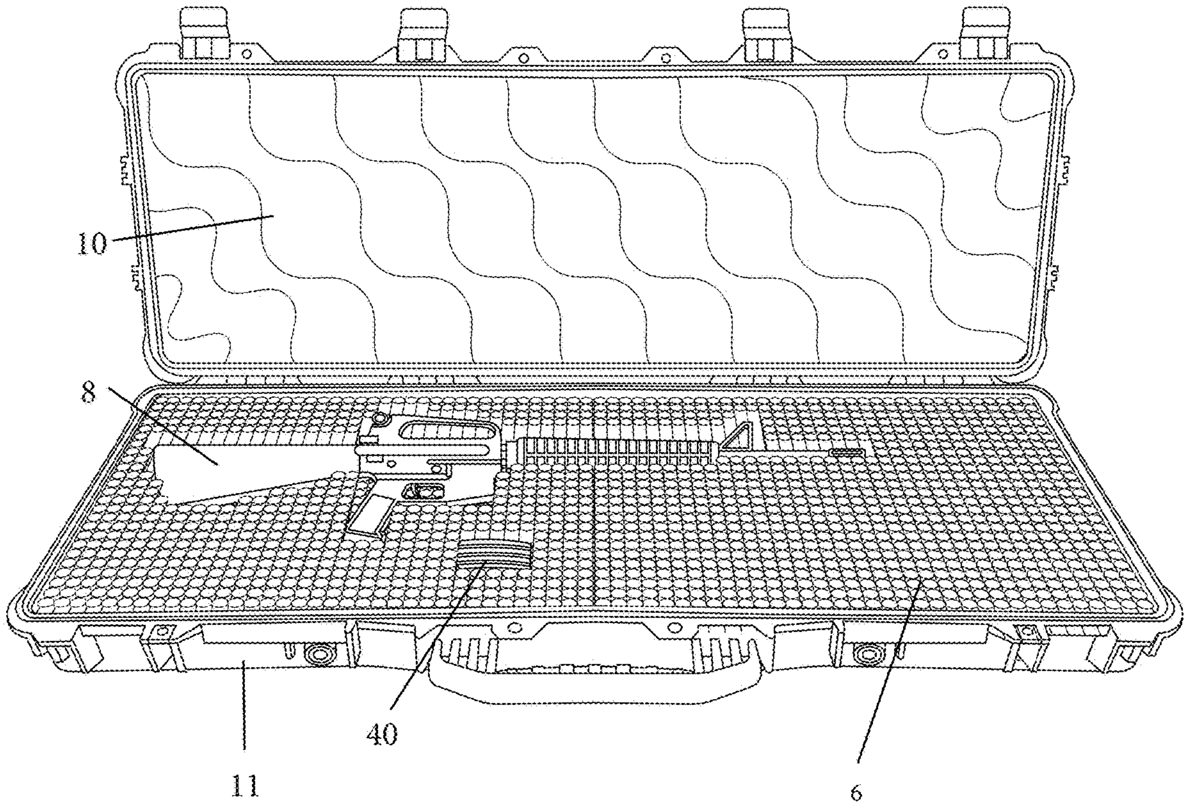
FIG. 22 is a front, perspective view of the case about to be closed upon the firearm.

FIG. 22 is a is a front, perspective view of how a firearm 8 could be nestled into the pegs. Note how the pegs 6 under the firearm 8 have been pushed down at varying depths through the grid plate into the negative space, while the pegs not under the firearm remain fully upright, providing support against the firearm moving around inside the case. Note too how a depression to store ammunition 40 could also be created in the same case. The case top 10 is padded with foam and will give the firearm protection from all six sides once the case top 10 is closed onto the case bottom 11.

Figure 23:
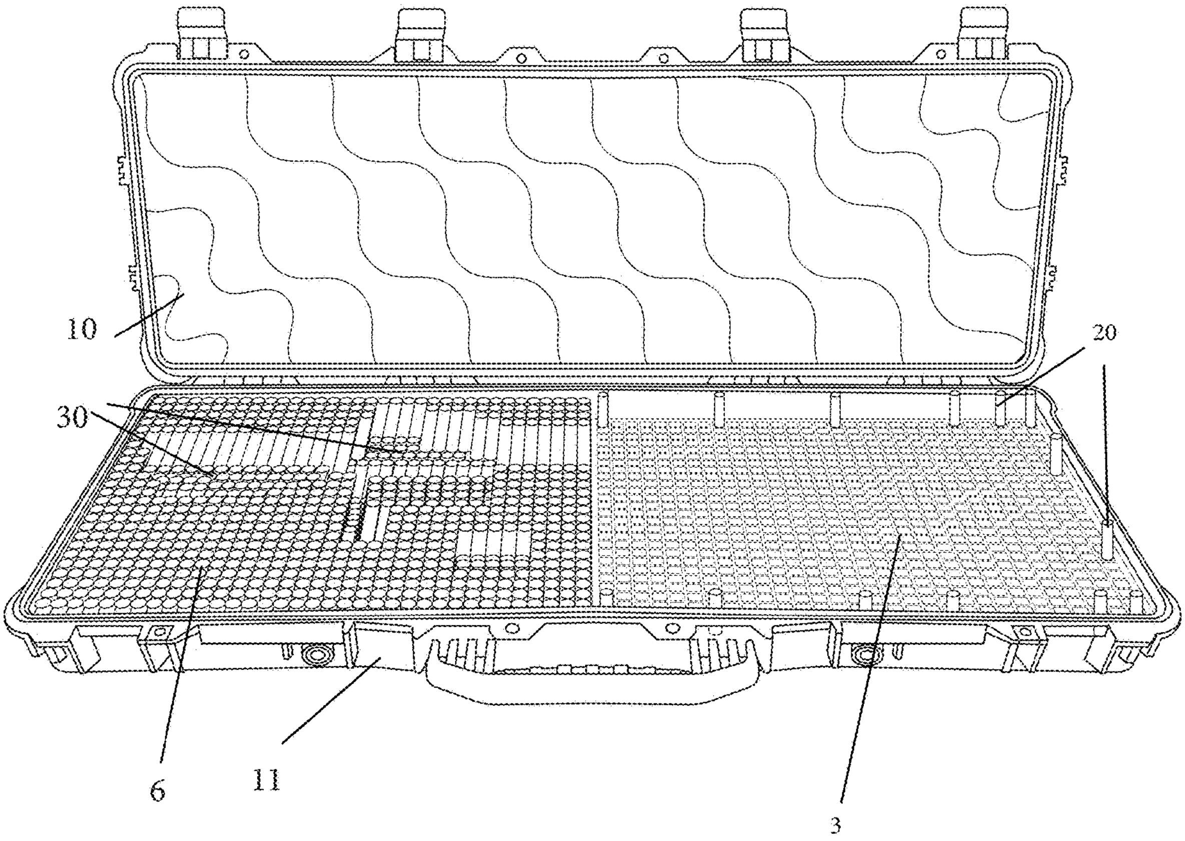
FIG. 23 is a front, perspective view of a case showing half the elevated grid plates with pegs inserted and the other half with just the grid and stepped pegs (without the pegs).

FIG. 23 is a front, perspective view of a case showing half the elevated grid plates with pegs inserted and the other half with just the grid and stepped pegs (without the pegs). This figure shows how a user can begin assembling the invention by "hanging" a grid plate 3 over stepped pegs 20. In the next step, pegs 6 are inserted into holes in the grid plate, and eventually, a desired shape 30 is created in the pegs 6 by depressing some of the pegs into the negative space below the grid plate.

Figure 24:
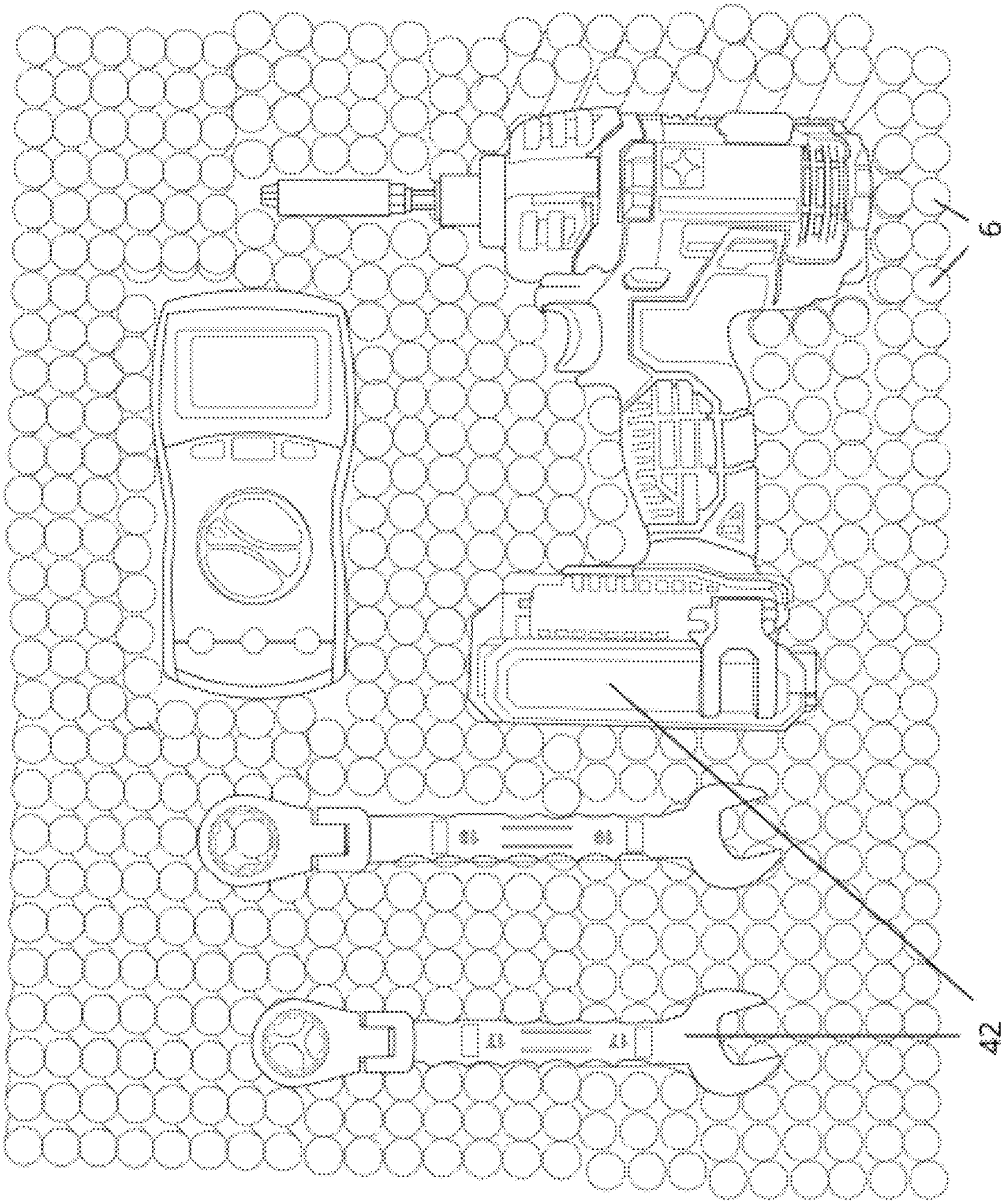
FIG. 24 is a top view of some tools nestled in the invention.

FIG. 24 is a top view of some tools 41 nestled in the invention. Some pegs 6 have been depressed into the grid plate (3 in other figures) to create the protective nests for the tools 41.

Figure 25:
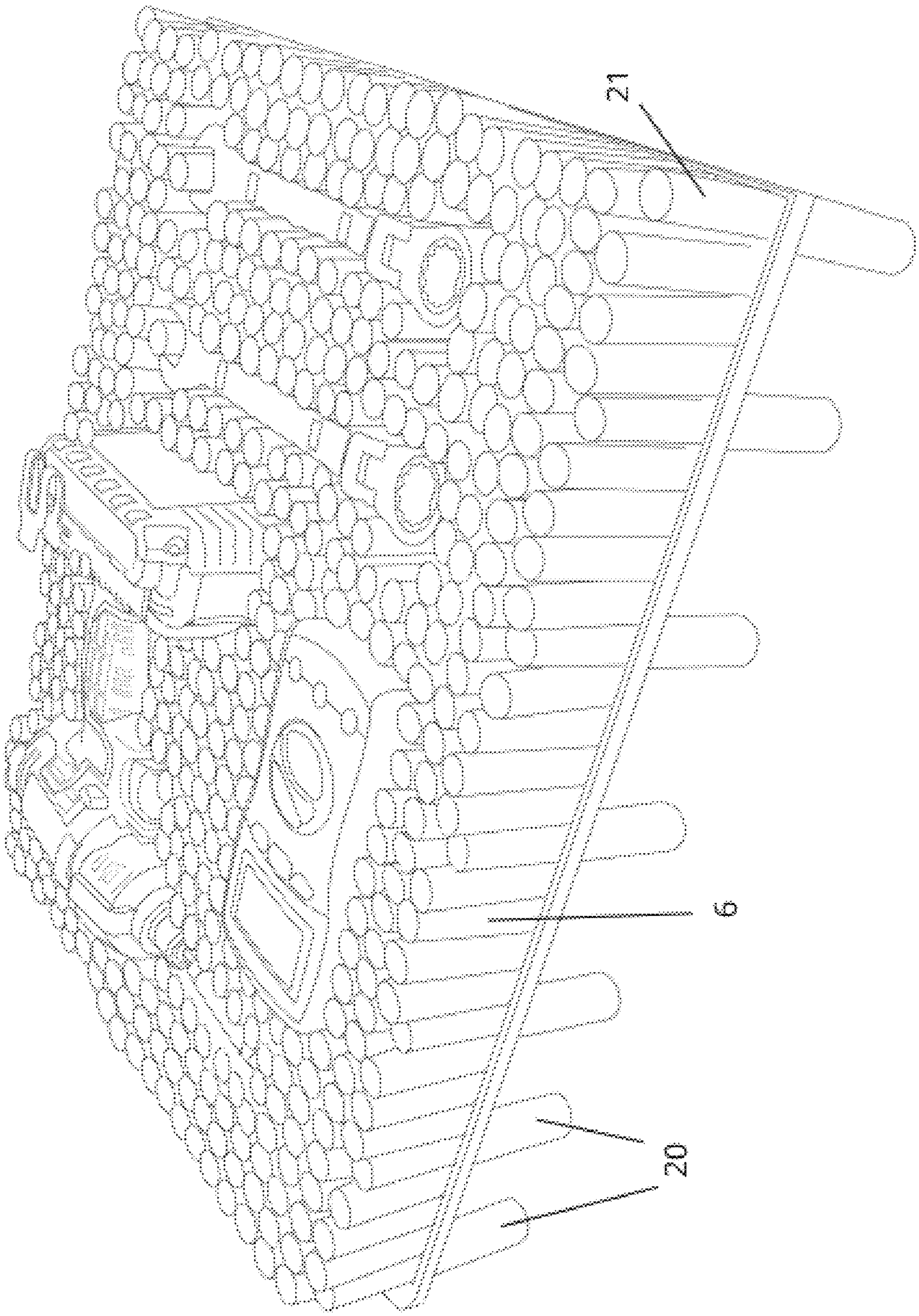
FIG. 25 is a side, perspective view of some tools nestled in the invention.

FIG. 25 is a side, perspective view of some tools 41 nestled in the invention. The pegs 6 have been inserted into the grid plate 3. The grid plate 3 is supported by the stepped pegs 20. Several tools rest in protective pockets created by pushing down on a pattens of pegs.

Figure 26:
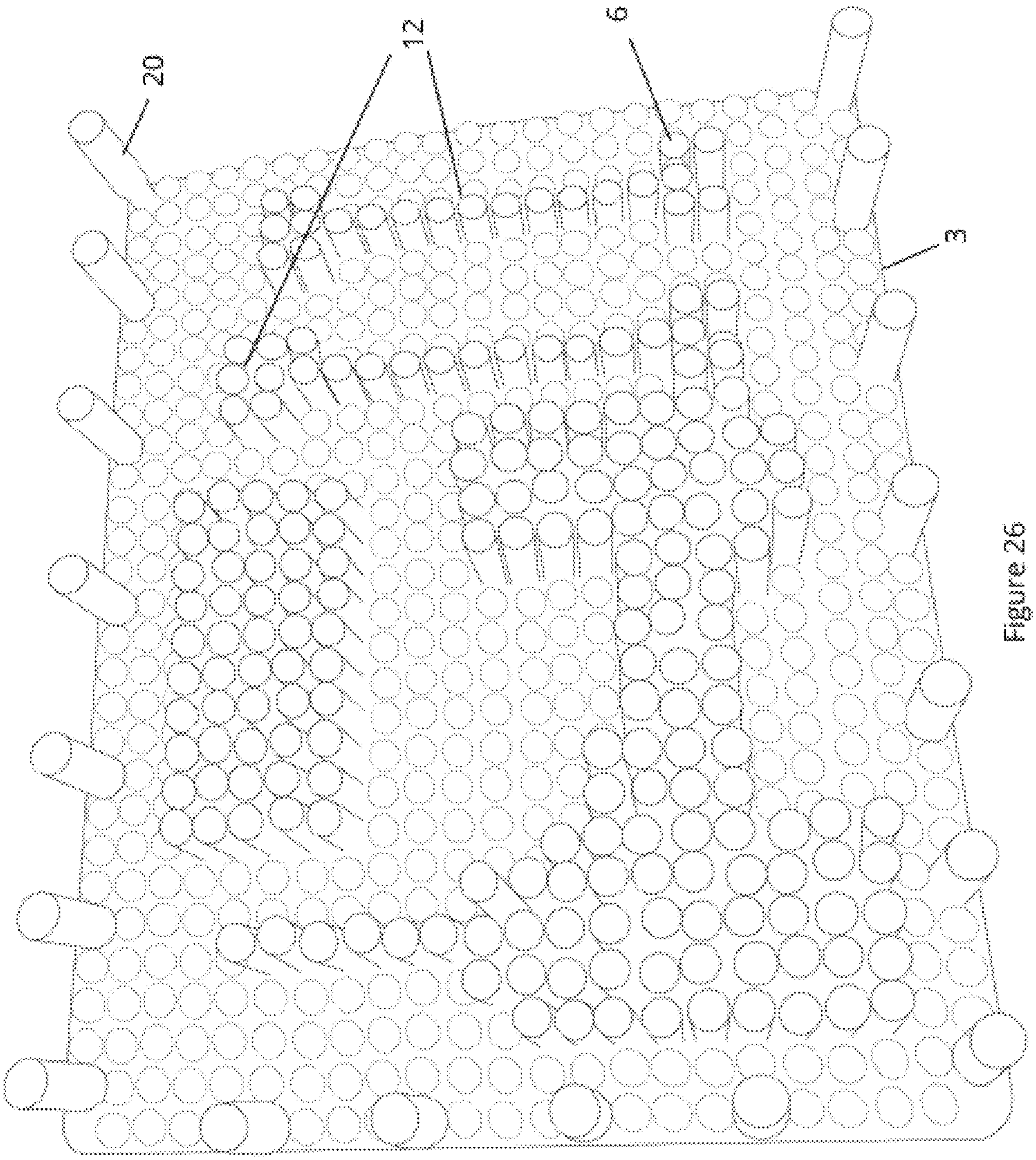
FIG. 26 is a bottom, side, perspective view of the grid plate showing a pattern that has bene depressed into the grid plate by pushing down on several of the pegs.

FIG. 26 is a bottom, side, perspective view of the grid plate 3 showing a pattern that has bene depressed into the grid plate by pushing down on several of the pegs 6. The bottom portion of the stepped pegs 20 is visible, and these stepped pegs have created the negative space into which some of the pegs 6 are pushed to create the shape for the tools.

Figure 27:
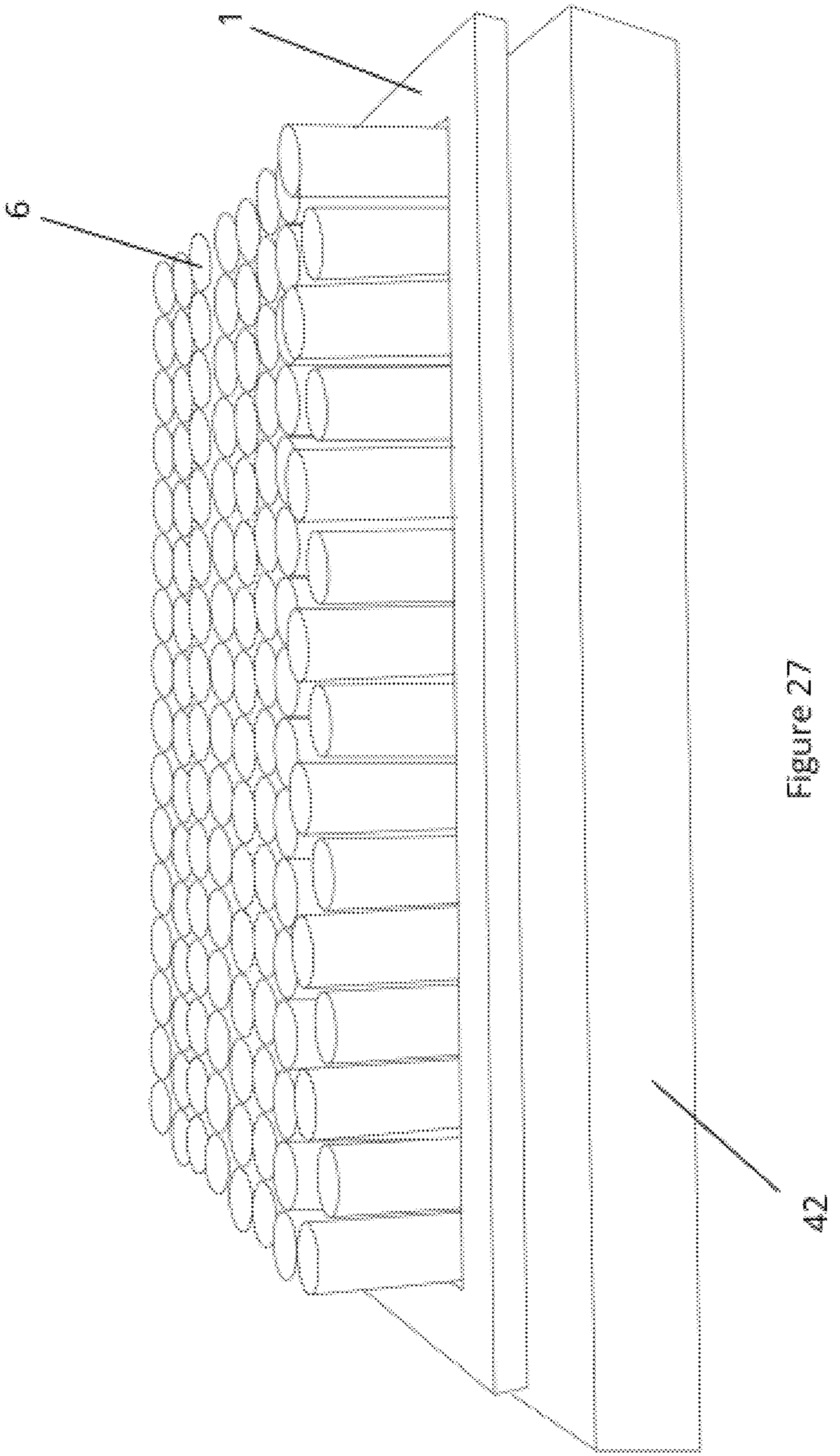
FIG. 27 is a side, perspective view of a grid plate with pegs sitting on top of foam cushion.

FIG. 27 is a side, perspective view of a grid plate with pegs 6 sitting on top of foam cushion 42.

Figure 28:
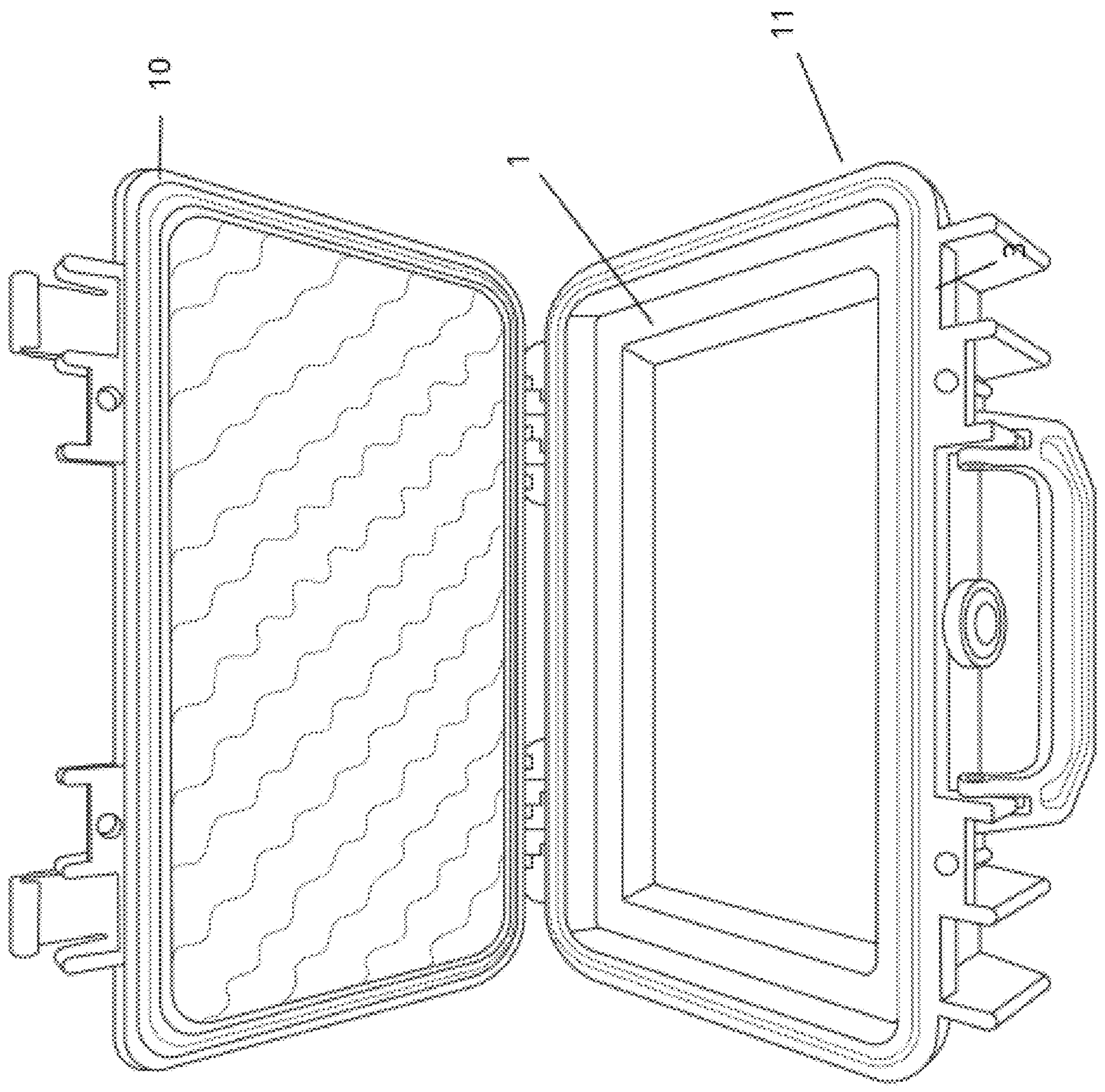
FIG. 28 is a front, perspective view of a case with a lower perimeter frame.

FIG. 28 is a front, perspective view of a case with a lower perimeter frame 1 already inserted.

Figure 29:
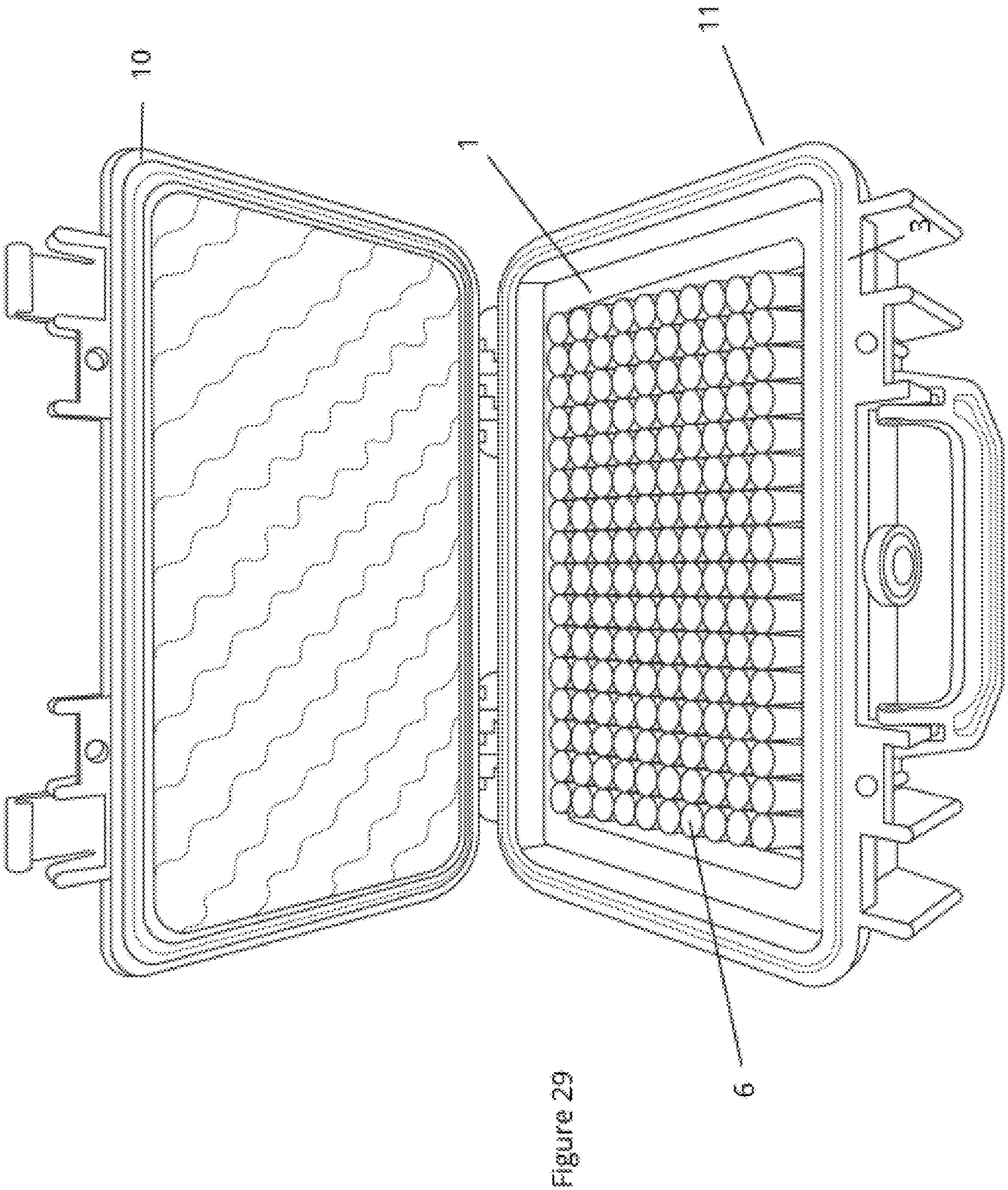
FIG. 29 is a front, perspective view of a case with pegs and an upper perimeter frame added.

FIG. 29 is a front, perspective view of the case of FIG. 28, where a grid plate, many pegs 6 and an upper perimeter frame 1 have been added.

Figure 30:
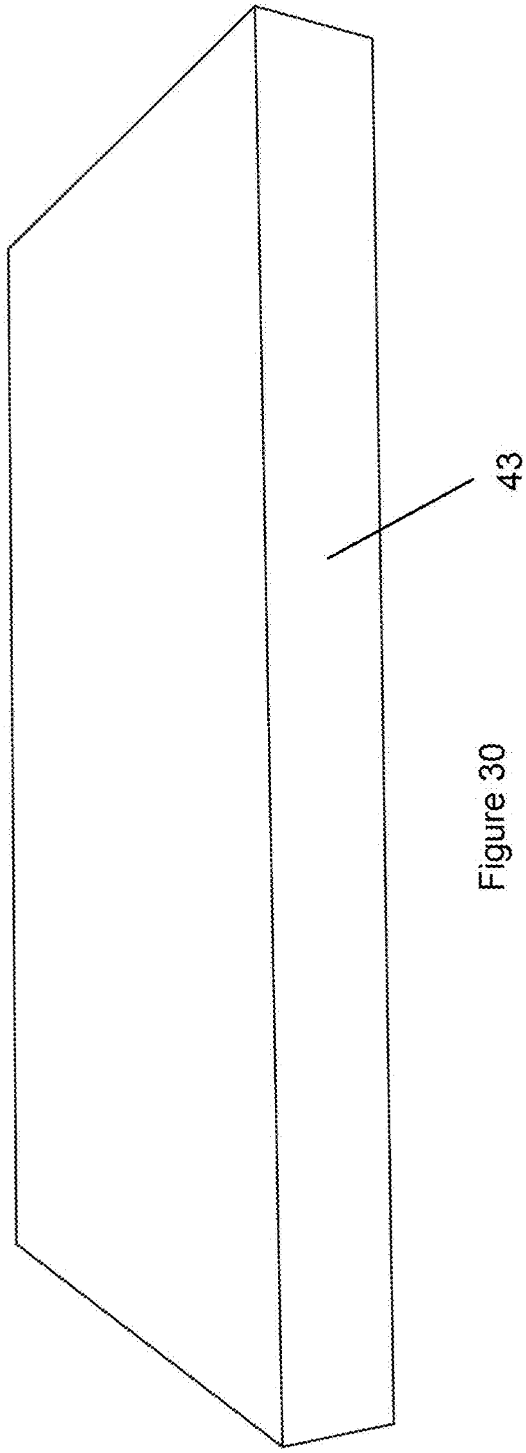
FIG. 30 is a side, perspective view of a foam cushion.

FIG. 30 is a side, perspective view of a foam cushion.

Figure 31:
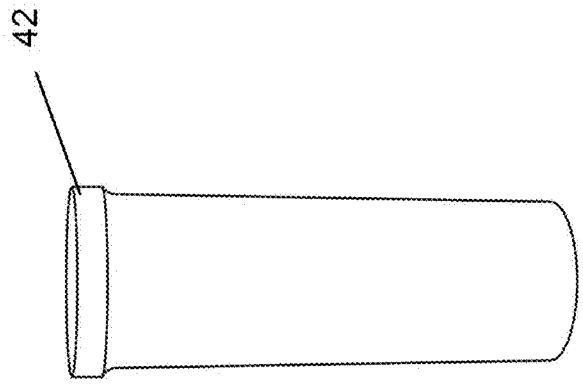
FIG. 31 is a side view of another embodiment of the round peg, with this round peg having an end that is slightly larger such that the pegs can't be pulled out of the grid from the top.

FIG. 31 is a side view of another embodiment of the round peg, with this round peg having an end 42 that is slightly larger such that the pegs can't be pulled out of the grid from the top.

Figure 32:
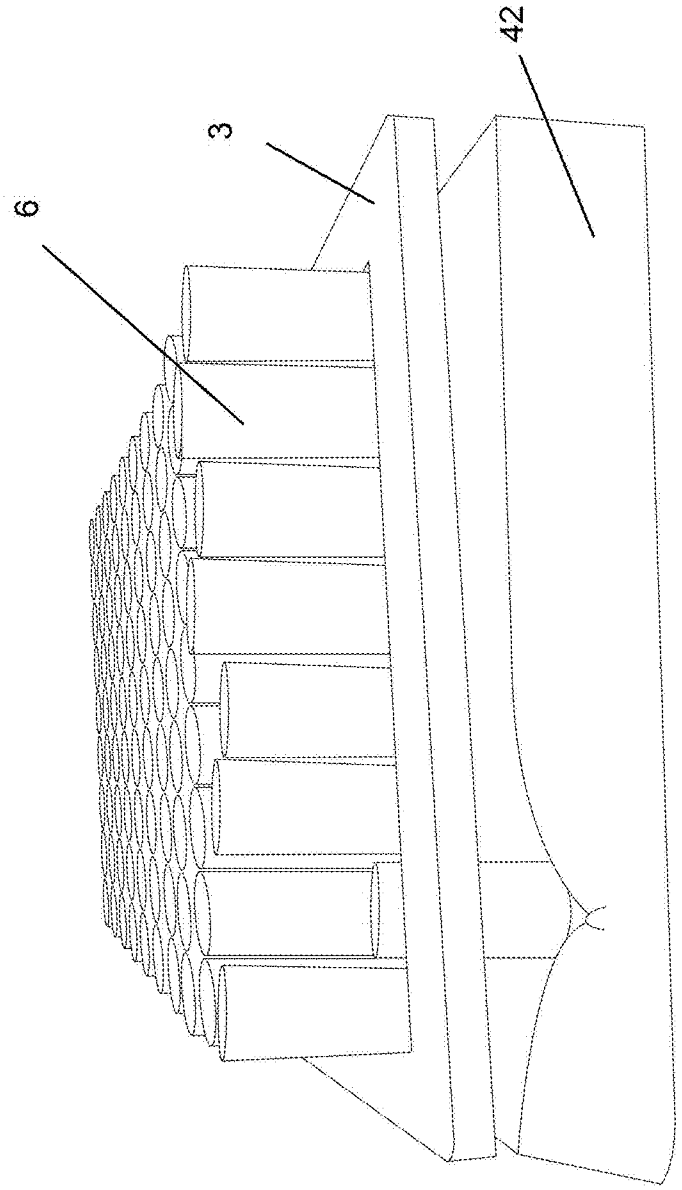
FIG. 32 is a side, perspective view of a grid plate with round pegs being depressed into a cushion.

FIG. 32 is a side, perspective view of a grid plate with round pegs 6 being depressed into a cushion 42.

Figure 33:
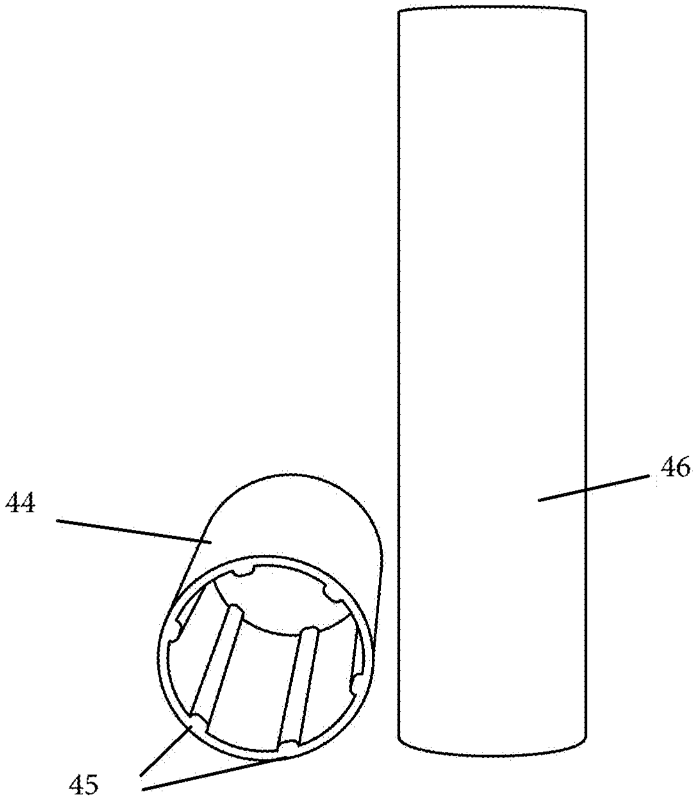
FIG. 33 is a side, perspective view of another embodiment of the lower support being a peg—this one with a straight peg and a holster, appearing unassembled.

FIG. 33 is a side, perspective view of another embodiment of the lower support being a peg—this one with a straight peg and a holster, appearing unassembled. In this figure, another embodiment of the peg—this one with a straight peg 46 and a holster 44—appears unassembled. The holster 44 slides over the end of the straight peg 45. A plurality of indentations 45 on the inside surface of the holster grip the outer surface of the straight peg. The top of the holster 44 forms the ledge upon which the grid plate will sit.

Figure 34:
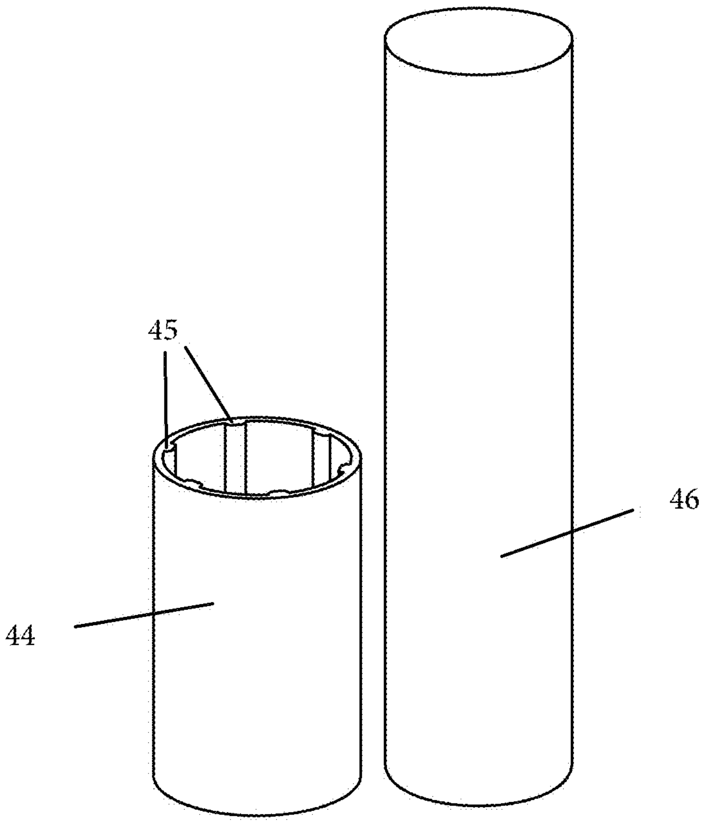
FIG. 34 is a side, perspective view of another embodiment of the peg—this one with a straight peg and a holster, appearing unassembled.

FIG. 34 is a side, perspective view of another embodiment of the peg—this one with a straight peg and a holster, appearing assembled. The straight peg 46 has a diameter that is slightly less that the length between on indentation 45 to an indentation on the opposite side of the inner surface of the holster 44. Thus, when the straight peg 46 is pushed into the holster 44, the indentations 45 removably grip the straight peg 46.

Figure 35:
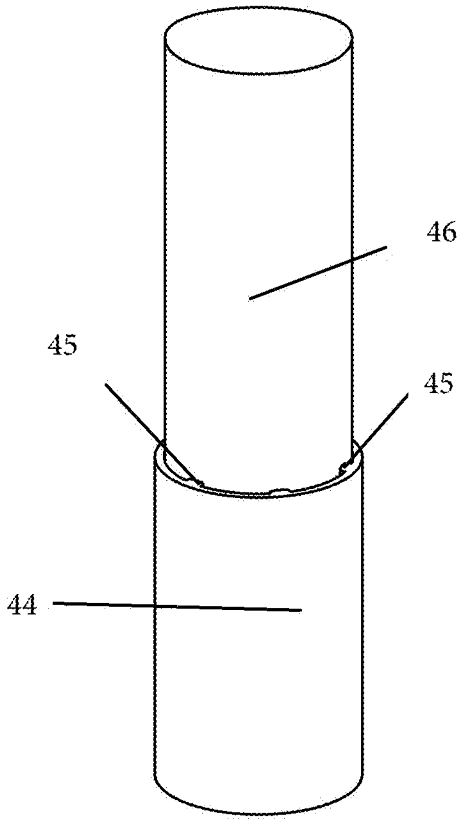
FIG. 35 is a side, perspective view of another embodiment of the peg—this one with a straight peg and a holster, appearing assembled.

FIG. 35 is a side, perspective view of another embodiment of the peg—this one with a straight peg 46 and a holster 44, appearing assembled. The holster 44 has been slid over the end of the straight peg 45. A plurality of indentations 45 on the inside surface of the holster grip the outer surface of the straight peg. The top of the holster 44 forms the ledge upon which the grid plate will sit.

Figure 36:
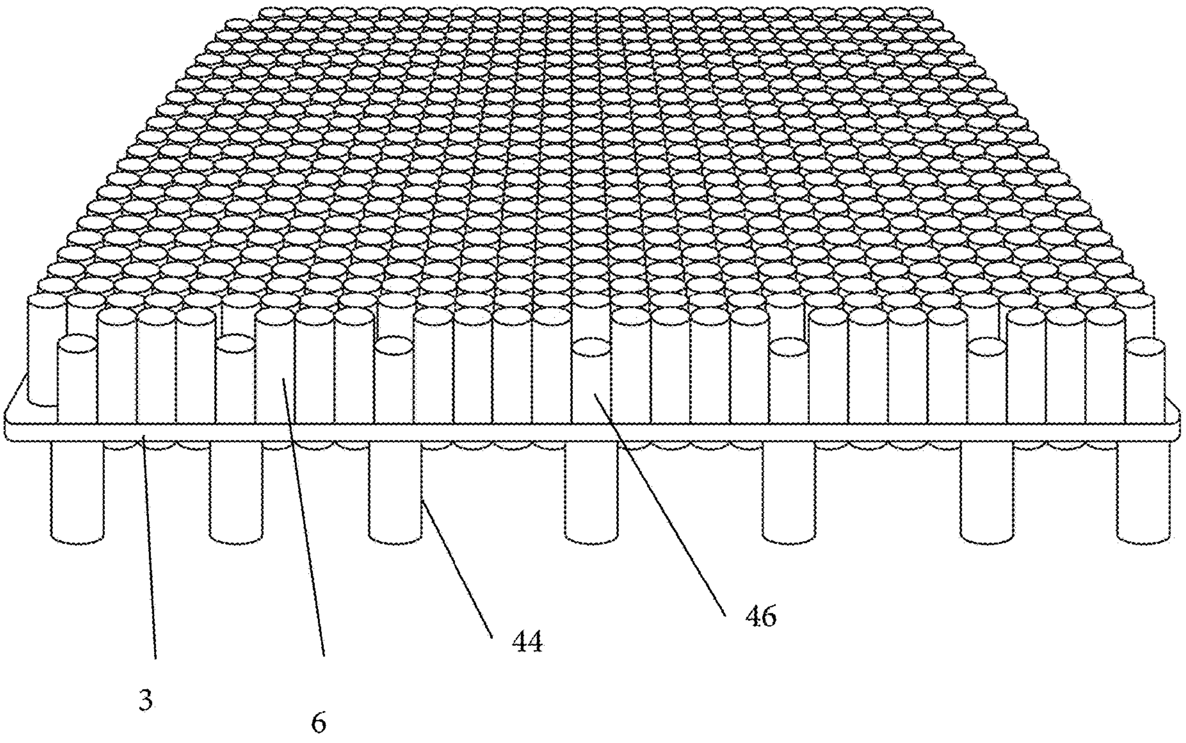
FIG. 36 is side, perspective view of a grid plate resting on the embodiment of the peg illustrated in FIGS. 33, 34 and 35.

FIG. 36 is side, perspective view of a grid plate resting on the embodiment of the peg illustrated in FIGS. 33, 34 and 35. A grid plate 3, rests on the tops of holsters 44, while the straight pegs 46, protrude through holes in the grid plate 3.

Figure 37:
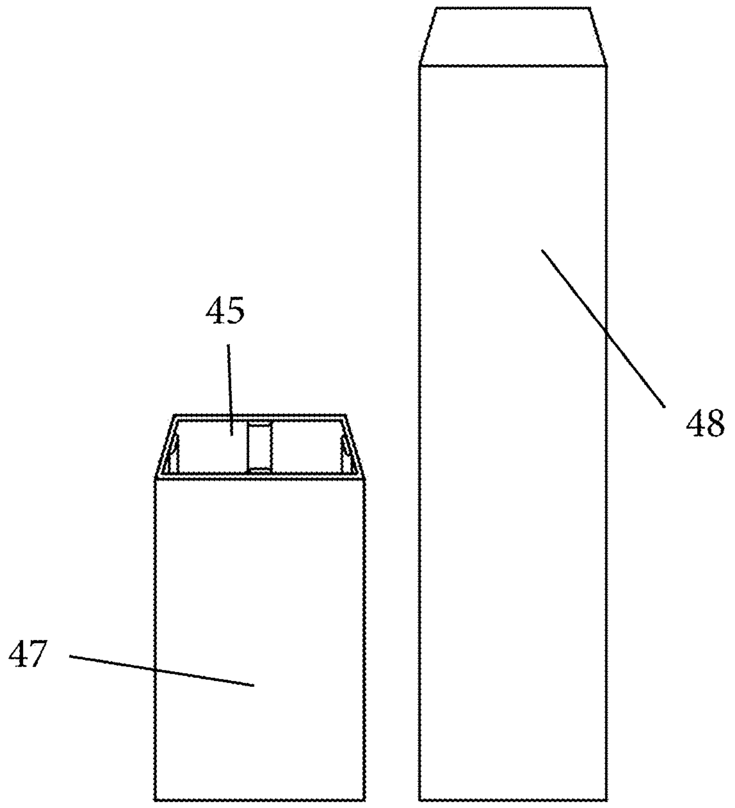
FIG. 37 is a is a side, perspective view of another embodiment of the lower support being a peg—this one with a straight square peg and a square holster, appearing unassembled.

FIG. 37 is a is a side, perspective view of another embodiment of the lower support being a peg—this one with a straight square peg 48 and a square holster 47, where the inner surface of the square holster 47 has one or more indentations 45, appearing unassembled.

Figure 38:
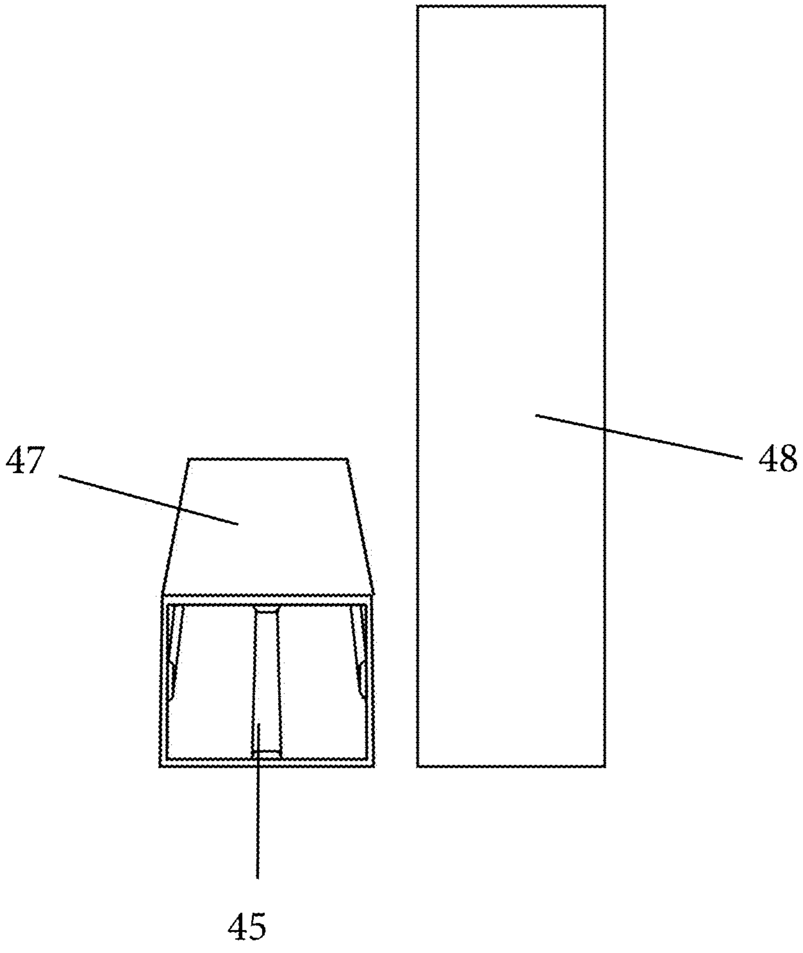

FIG. 38 is a side, perspective view of another embodiment of the square peg—this one with a square straight peg 48 and a square holster 47, appearing unassembled. This figure shows the indentations 45 on the inner surface of the square holster 47.

Figure 39:
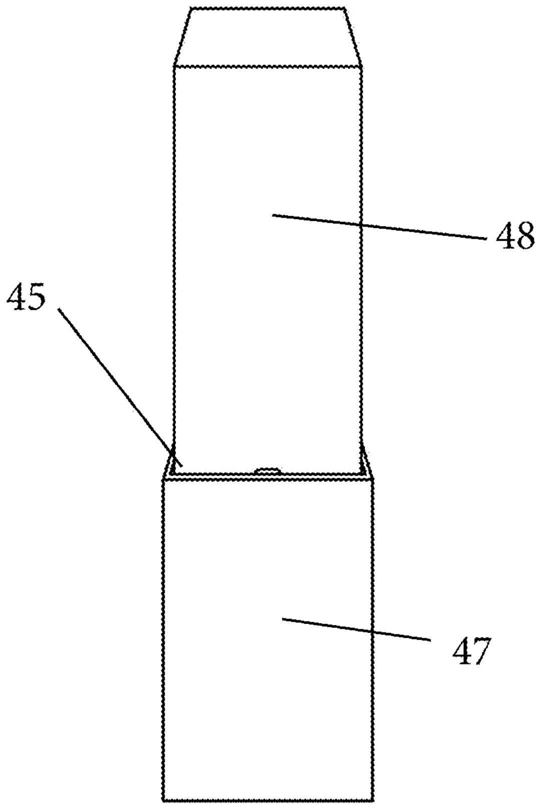
FIG. 39 is a side, perspective view of another embodiment of the square peg—this one with a square straight peg and a square holster, appearing unassembled.

FIG. 39 is a side, perspective view of another embodiment of the square peg—this one with a square straight peg 48 and a square holster 47, appearing assembled. The square straight peg 48 has been inserted into the square holster 47, and the indentations 45 on the inside of the square holster retain the square straight peg 48.

Brief Summary of the Invention. The invention has an elevated grid with foam pegs that is held up by a "lower support", which can be a series of stepped pegs, peg/holster combinations, or a lower frame. The peg/holster embodiment has a straight peg of uniform diameter that has been slipped into a holster, where the holster has indentations on its inside surface. The indentations press into the outer sides of the straight peg, frictionally retaining it. The foam pegs are inserted into the grid and held in place by friction due to the design of the pegs being slightly larger than the size of the grid patterns (square, round or other). The elevated grid and pegs allow for space under the grid so that the pegs can then be depressed down in the shape of the object that sits on top of the grid/pegs giving the object full protection around its perimeter. The pegs can be depressed down until they hit the surface that the elevated grid system is on, giving protection and support to the bottom of the object sitting above. Added protection can be applied by the lid of a case with foam that can be closed down on top of the grid and pegs. The pegs never have to be removed and/or changed into new positions to add protection. The user of our system simply has to push the pegs down into their desired shape. User can easily "reset" their grid and pegs by simply pushing the pegs back to their starting elevated position.

Each of the additional figures and methods disclosed herein can be used separately, or in conjunction with other features and methods, to provide improved devices and methods for making and using the same. Therefore, combinations of features and methods disclosed herein may not be necessary to practice the disclosure in its broadest sense and are instead disclosed merely to particularly describe representative and preferred embodiments.

Various modifications to the embodiments may be apparent to one of skill in the art upon reading this disclosure. For example, persons of ordinary skill in the relevant arts will recognize that the various features described for the different embodiments can be suitably combined, un-combined, and re-combined with other features, alone, or in different combinations. Likewise, the various features described above should all be regarded as example embodiments, rather than limitations to the scope or spirit of the disclosure.

Persons of ordinary skill in the relevant arts will recognize that various embodiments can comprise fewer features than illustrated in any individual embodiment described above. The embodiments described herein are not meant to be an exhaustive presentation of the ways in which the various features may be combined. Accordingly, the embodiments are not mutually exclusive combinations of features; rather, the claims can comprise a combination of different individual features selected from different individual embodiments, as understood by persons of ordinary skill in the art.

Any incorporation by reference of documents above is limited such that no subject matter is incorporated that is contrary to the explicit disclosure herein. Any incorporation by reference of documents above is further limited such that no claims included in the documents are incorporated by reference herein. Any incorporation by reference of documents above is yet further limited such that any definitions provided in the documents are not incorporated by reference herein unless expressly included herein.

Unless indicated otherwise, references to "embodiment(s)", "disclosure", "present disclosure", "embodiment(s) of the disclosure", "disclosed embodiment(s)", and the like contained herein refer to the specification (text, including the claims, and figures) of this patent application that are not admitted prior art.

For purposes of interpreting the claims, it is expressly intended that the provisions of 35 U.S.C. 112(f) are not to be invoked unless the specific terms "means for" or "step for" are recited in the respective claim.

It should be understood that while the preferred embodiments of the invention are described in some detail herein, the present disclosure is made by way of example only and that variations and changes thereto are possible without departing from the subject matter coming within the scope of the following claims, and a reasonable equivalency thereof, which claims I regard as my invention.

All of the material in this patent document is subject to copyright protection under the copyright laws of the United States and other countries. The copyright owner has no objection to the facsimile reproduction by anyone of the patent document or the patent disclosure, as it appears in official governmental records but, otherwise, all other copyright rights whatsoever are reserved.

Glossary of Terms

1. Lower Perimeter
2. Upper Perimeter
3. Grid Plate
4. Lattice
5. Opening
6. Round Peg
7. Square Peg
8. Toy Pistol
9. Negative Space
10. Case Top
11. Case Bottom
12. Object Depressions
13. Case Top Foam
20. Stepped peg
21. Upper portion
22. Bottom portion
23. Step
30. Depressed pegs
40. Ammunition
41. Tool
42. Foam pad
43. Enlarged end
44. Holster
45. Indentations
46. Straight Peg

What I claim is:

1. An insert for protecting a valuable/fragile item in a case, comprising a lower support, a grid plate, and a plurality of pegs, wherein the grid plate has a lattice that defines a plurality of openings, wherein each of the plurality of openings has an opening width, wherein the plurality of pegs fit within the plurality of openings, wherein each of the plurality of pegs has a peg width, and the peg width is slightly larger than the opening width, such that each of the plurality of pegs is frictionally but movably secured in each opening, wherein the grid plate is located above the lower support such that a negative space is created below the grid plate, wherein an object is pressed into the plurality of pegs, resulting in some depressed pegs being depressed into the negative space and some original pegs remaining in an upright position, wherein the object is secured on an object bottom by the depressed pegs and secured on an object side by the original pegs, wherein the lower support comprises a plurality of pegs, wherein each peg has a ledge, wherein the grid plate rests on the ledge, wherein the lower support is a plurality of stepped pegs, wherein each of the stepped pegs has a bottom portion, a top portion, and a step, wherein the top portion has a top portion diameter, wherein the top portion diameter is less than the opening diameter of a grid plate opening, wherein the bottom portion has a bottom portion diameter than is greater than the opening diameter of the grid plate opening, wherein the bottom portion transition to the top portion at a step, wherein the grid plate rests upon the step, wherein the openings are square, and have an edge distance, and wherein the peg is square, and wherein the edge distance of the openings is larger than a peg edge distance of the peg, and greater than an opening edge distance, wherein a square ledge is created at the top of the opening, wherein the grid plate rests on the ledge, wherein the opening has one or more indentations on an inside surface, wherein the indentations create a frictional element when the peg is inserted into the opening, wherein, the peg is removably retained within the opening.

2. An insert for protecting a valuable/fragile item in a case, comprising a lower support, a grid plate, and a plurality of pegs, wherein the grid plate has a lattice that defines a plurality of openings, wherein each of the plurality of openings has an opening width, wherein the plurality of pegs fit within the plurality of openings, wherein each of the plurality of pegs has a peg width, and the peg width is slightly larger than the opening width, such that each of the plurality of pegs is frictionally but movably secured in each opening, wherein the grid plate is located above the lower support such that a negative space is created below the grid plate, wherein an object is pressed into the plurality of pegs, resulting in some depressed pegs being depressed into the negative space and some original pegs remaining in an upright position, wherein the object is secured on an object bottom by the depressed pegs and secured on an object side by the original pegs, wherein the lower support comprises a plurality of pegs, wherein each peg has a ledge, wherein the grid plate rests on the ledge, wherein the lower support is a plurality of peg/opening combinations, wherein the peg nestles inside the opening, wherein the opening has an opening height that is less than a peg height, such that a top portion of the opening creates a circular ledge, upon which the grid plate rests.

3. The insert of claim 2, wherein each of the plurality of straight peg/holster combinations consists of a straight peg, which comprises a cylinder, and a holster, which comprises a circular band with one or more indentions on an inner surface of the holster, wherein each of the one or more indentations has a length, wherein the length is the distance away from the inner surface of the holster the indentation extends, and the length of each of the one or more indentations creates an opening in the center of the holster, wherein the opening is less than a circumference of the straight peg, such that the straight peg is removably secured within the holster, wherein the straight peg has a straight peg diameter, wherein the straight peg diameter is less than the opening diameter of a grid plate opening, wherein the holster has a holster diameter than is greater than the opening diameter of the grid plate opening, wherein a top portion of the holster creates a ledge, wherein the grid plate rest upon the ledge.

4. The insert of claim 2, wherein each of the plurality of straight peg/holster combinations consists of a square straight peg, which comprises a peg with four square sides, and a square holster, which comprises a square band with one or more indentions on an inner surface of the square holster, wherein each of the one or more indentations has a length, wherein the length is the distance away from the inner surface of the square holster the indentation extends, and the length of each of the one or more indentations creates an opening in the center of the square holster, wherein the opening is less than a circumference of the square straight peg, such that the square straight peg is removably secured within the square holster, wherein the square straight peg has a square straight peg side width, wherein the square straight peg side width is less than the opening diameter of a grid plate opening, wherein the square holster has a square holster diameter than is greater than the opening diameter of the grid plate opening, wherein a top portion of the square holster creates a square holster ledge, wherein the grid plate rest upon the square holster ledge.

5. An insert for protecting a valuable/fragile item in a case, comprising a lower support, a grid plate, and a plurality of pegs, wherein the grid plate has a lattice that defines a plurality of openings, wherein each of the plurality of openings has an opening width, wherein the plurality of pegs fit within the plurality of openings, wherein each of the plurality of pegs has a peg width, and the peg width is slightly larger than the opening width, such that each of the plurality of pegs is frictionally but movably secured in each opening, wherein the grid plate is located above the lower support such that a negative space is created below the grid plate, wherein an object is pressed into the plurality of pegs, resulting in some depressed pegs being depressed into the negative space and some original pegs remaining in an upright position, wherein the object is secured on an object bottom by the depressed pegs and secured on an object side by the original pegs, wherein the lower support comprises a plurality of pegs, wherein each peg has a ledge, wherein the grid plate rests on the ledge, wherein the lower support is a plurality of peg/holster combinations, wherein the peg nestles inside the holster, wherein the holster has a holster height that is less than a peg height, such that a top portion of the holster creates a holster ledge, upon which the grid plate rests.

6. The insert of claim 5, wherein each of the plurality of straight peg/holster combinations consists of a square peg, which comprises a peg with four square sides, and a square opening, which comprises a square band with one or more indentions on an inner surface of the square opening, wherein each of the one or more indentations has a length, wherein the length is the distance away from the inner surface of the square holster the indentation extends, and the length of each of the one or more indentations creates an opening in the center of the square opening, wherein the opening is less than a circumference of the square peg, such that the square peg is removably secured within the square opening, wherein the square peg has a square peg side width, wherein the square peg side width is less than the opening diameter of the opening, wherein the square holster has a square opening diameter than is greater than the opening diameter of the grid plate opening, wherein a top portion of the square opening creates a square opening ledge, wherein the grid plate rest upon the square opening ledge.

7. The insert of claim 5, wherein each of the plurality of peg/opening combinations consists of a peg, which comprises a cylinder, and an opening, which comprises a circular band with one or more indentions on an inner surface of the opening, wherein each of the one or more indentations has a length, wherein the length is the distance away from the inner surface of the opening the indentation extends, and the length of each of the one or more indentations creates an opening in the center of the opening, wherein the opening is less than a circumference of the straight peg, such that the straight peg is removably secured within the opening, wherein the peg has a peg diameter, wherein the peg diameter is less than the opening diameter of a grid plate opening, wherein the opening has a holster diameter than is greater than the opening diameter of the grid plate opening, wherein a top portion of the holster creates a ledge, wherein the grid plate rest upon the ledge.

8. The insert of claim 7, wherein the number of peg/opening combinations is more than four, and four of the peg/opening combinations are located at a corner of the grid plate.

9. The insert of claim 7, additionally comprising a foam top, wherein the case has a case bottom and a case top, wherein an upper perimeter adds protection to the plurality of pegs, wherein the case top comprises a case top foam, wherein the case top foam secures the object from a top direction when the case top is closed upon the case bottom.

10. The insert of claim 7, wherein in the lower support comprises at least four peg/opening combinations.

11. The insert of claim 10, wherein each of the four peg/opening combinations is located at a corner of the grid plate.

* * * * *